US 6,744,530 B1

(12) United States Patent
Someno et al.

(10) Patent No.: US 6,744,530 B1
(45) Date of Patent: Jun. 1, 2004

(54) PRINTING APPARATUS FOR CONTINUOUS PRINTING

(75) Inventors: Masahiro Someno, Nagano-ken (JP); Nobuyuki Kono, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/448,435

(22) Filed: Nov. 24, 1999

(30) Foreign Application Priority Data

Nov. 27, 1998 (JP) .......................................... 10-353963
Oct. 18, 1999 (JP) .......................................... 11-295082

(51) Int. Cl.$^7$ .............................................. G06F 15/00
(52) U.S. Cl. ...................................... 358/1.18; 358/3.27
(58) Field of Search ........................ 358/1.1, 1.9, 3.01, 358/3.02, 3.06, 3.1, 3.12, 3.15, 3.23, 3.27, 3.26, 1.17, 1.18; 382/254, 255, 294, 299; 347/12, 40, 41, 43, 96

(56) References Cited

U.S. PATENT DOCUMENTS

| | | | | |
|---|---|---|---|---|
| 4,853,740 A | * | 8/1989 | Ushio et al. | 399/402 |
| 5,493,318 A | * | 2/1996 | Negoro et al. | 346/136 |
| 5,566,004 A | * | 10/1996 | Imaizumi et al. | 358/450 |
| 5,638,498 A | | 6/1997 | Tyler et al. | 358/1.18 |
| 5,696,542 A | * | 12/1997 | Matsubara et al. | 347/12 |
| 5,980,020 A | * | 11/1999 | Miura et al. | 347/41 |
| 6,120,141 A | * | 9/2000 | Tajika et al. | 347/96 |
| 6,130,685 A | * | 10/2000 | Matsubara et al. | 347/41 |
| 6,164,756 A | * | 12/2000 | Takahashi | 347/43 |
| 6,206,502 B1 | * | 3/2001 | Kato et al. | 347/41 |
| 6,250,737 B1 | * | 6/2001 | Matsubara et al. | 347/40 |

FOREIGN PATENT DOCUMENTS

| | | |
|---|---|---|
| EP | 0 508 784 | 10/1992 |
| EP | 0 679 518 | 11/1995 |
| EP | 0 742 103 | 11/1996 |
| JP | 10-12940 | 5/1998 |
| JP | 10-286998 | 10/1998 |

OTHER PUBLICATIONS

Patent Abstracts of Japan, JP 10–202976, Aug. 4, 1998.

* cited by examiner

*Primary Examiner*—Gabriel Garcia
(74) *Attorney, Agent, or Firm*—Oblon, Spivak, McClelland, Maier & Neustadt, P.C.

(57) ABSTRACT

In a printing apparatus of the present invention, image data divided into a plurality of pages and supplied from an application program are printed on a roll of machine glazed paper without any margins set between adjoining pages. This arrangement enables a large image to be printed on a large-sized printing medium, such as a banner. A printer driver in the printing apparatus sets feeding amounts of sub-scan according to a selected printing mode. In the case where a standard printing mode is selected, the printer driver sets the feeding amounts to execute an upper end process and a lower end process with regard to each page. In the case where a continuous printing mode is selected, on the other hand, the printer driver maintains a periodic variation of standard feeding amount, except the upper end process carried out in a first page. When a print head is located across a boundary between adjoining pages in the course of printing in the continuous printing mode, print data with regard to the adjoining two pages across the boundary are output to the respective nozzles, and specific areas immediately before and after the boundary are recorded simultaneously by one pass of the main scan. This arrangement of the present invention effectively prevents banding from occurring in the vicinity of the boundary.

14 Claims, 16 Drawing Sheets

| TABLE FOR UPPER END PROCESS | 3 3 3 3 3 3 \| 5 2 3 6 5 2 ⋯<br>UPPER END PROCESS ⇔ STANDARD FEEDING |
| --- | --- |
| STANDARD TABLE | 5 2 3 6 |
| TABLE FOR UPPER AND LOWER END PROCESSES | 3 3 3 3 3 3 \| 5 2 3 6 ⋯ \| 3 3 3 ⋯<br>UPPER END PROCESS ⇔ STANDARD FEEDING ⇔ LOWER END PROCESS |

PRINTING APPARATUS FOR CONTINUOUS PRINTING

BACKGROUND OF THE INVENTION

1. Field of the Invention

The present invention relates to a printing apparatus that carries out continuous printing, in which a large image is printed on a large-sized printing medium.

2. Description of the Related Art

The ink jet printer, which creates dots using a plurality of different color inks ejected from a plurality of nozzles provided on a print head and thereby records an image, has been proposed as an output device of a computer and widely used to print an image processed by the computer in a multi-color, multi-tone manner. This printer enables an image to be printed on a large-sized printing medium, such as a roll of machine glazed paper. Such printing procedure is hereinafter referred to as continuous printing. A large image may be printed on a printing medium of several ten meters, for example, a banner.

There is generally a restriction in quantity of image data processed at once by an application program. In the case of continuous printing, the application program accordingly supplies print data divided in a plurality of pages. In the case of standard printing, a certain margin is present between adjoining pages. The process of continuous printing removes the margin between the adjoining pages and thereby enables an integrated image to be printed while receiving image data divided into a plurality of pages.

The ink jet printer generally uses a print head, on which a large number of nozzles are arranged in a sub-scanning direction, in order to enhance the printing speed. There is a technique called the interlace process, which may be adopted in the ink jet printer with such a print head as one of the recording processes that improve the picture quality.

FIG. 16 shows an example of the interlace process. In the example of FIG. 16, three nozzles are arranged at a nozzle pitch of two dots. Circles in FIG. 16 represent dots created by the respective nozzles. The tens digit in each encircled numeral represents a nozzle number that creates the dot, and the units digit represents the pass of main scan that records the dot. In this example, the $1^{st}$ pass of the main scan creates dots on the respective raster lin the $2^{nd}$ nozzle and the $3^{rd}$ nozzle, whereas the $1^{st}$ nozzle does not create any dots. After a sub-scan by 3 raster lines, the $2^{nd}$ pass of the main scan is carried out to form raster lines with all the $1^{st}$ through the $3^{rd}$ nozzles. Subsequently the combination of the sub-scan by 3 raster lines with formation of raster lines by each pass of the main scan is repeated to complete an image. As clearly understood from the illustration, no raster line is actually formed with the $1^{st}$ nozzle on the $1^{st}$ pass of the main scan, because no raster line that adjoins to the phantom raster line formed with the $1^{st}$ nozzle on the $1^{st}$ pass of the main scan can be formed by the $2^{nd}$ or any subsequent pass of the main scan.

The interlace process forms raster lines intermittently in the sub-scanning direction to record an image. The advantage of the interlace process is that variations of the nozzle pitch and the ink ejection properties can be dispersed on the resulting recorded image. Even when there are some variations in nozzle pitch and ink ejection properties, the interlace process relieves the adverse effects of these variations and improves the picture quality of the resulting recorded image. FIG. 16 shows only an example in which each raster line is formed at a certain nozzle pitch by one pass of the main scan. The image may, however, be recorded according to the interlace process with various amounts of sub-scan, which depend upon the nozzle pitch, the number of nozzles, the number of repeated scans, and other factors.

The interlace process is also applicable to the continuous printing. There are, however, several phantom raster lines, which do not actually contribute to formation of a resulting image, both in an upper end and a lower end of a printing area by the interlace process as clearly shown in FIG. 16. In the case of continuous printing, it is required to print an image without any margins set between each pair of adjoining pages. The presence of such phantom raster lines that do not contribute to formation of an image is accordingly not allowed in the continuous printing. When the continuous printing mode is selected, the conventional technique carries out an upper end process and a lower end process in both the upper end and the lower end of each page, in order to avoid the presence of the phantom raster lines that do not contribute to formation of an image. The upper end process and the lower end process perform the sub-scan by irregular feeding amounts, while recording raster lines as discussed below.

FIG. 17 shows a state of continuous printing by the conventional technique. In the example of FIG. 17, image data divided into N pages are printed in a predetermined area on an integral, continuous printing medium. The upper end process carried out in the upper end of each page and the lower end process carried out in the lower end of each page enable a resulting image to be recorded without any margins between each pair of adjoining pages.

FIG. 18 shows an example of the lower end process. In the example of FIG. 18, the print head has seven nozzles arranged at a nozzle pitch of four dots in the sub-scanning direction. Solid circles represent the positions of the respective nozzles, and encircles numerals represent the nozzle numbers. Broken circles are drawn to clarify the nozzle pitch. Each column, which starts from the left end of the drawing, represents the position of the print head in the sub-scanning direction on each pass of the main scan. Before the lower end process starts, the sub-scan by 7 raster lines is carried out after every pass of the main scan. The lower end process first carries out the sub-scan of 4 raster lines, then repeats the sub-scan of 3 raster lines four times, and subsequently carries out the minute sub-scan of 1 raster line four times. This variation in feeding amount of sub-scan enables an image to be recorded without any drop-out of raster lines up to an end raster line where the $7^{th}$ nozzle is located on the last pass of the main scan as shown in FIG. 18.

FIG. 19 shows an example of the upper end process. The symbols in FIG. 19 have the same meanings as those of FIG. 18. The upper end process first carries out the minute sub-scan of 1 raster line four times, then repeats the sub-scan of 3 raster lines four times, and subsequently carries out the sub-scan of 4 raster lines. On completion of the upper end process, the standard sub-scan, that is, the sub-scan by 7 raster lines, is carried out after every pass of the main scan. This variation in feeding amount of sub-scan enables an image to be recorded from a $1^{st}$ raster line where the $1^{st}$ nozzle is located on the $1^{st}$ pass of the main scan as shown in FIG. 19.

In the conventional technique of continuous printing, however, there is banding, that is, misalignment of the positions of dot creation, on the boundary between adjoining pages. As described previously, the continuous printing procedure by the conventional technique performs the lower end process to print an image to the lower-most end of each page, and subsequently carries out the sub-scan by a large feeding amount. After the sub-scan by a large feeding amount, the procedure continues printing the image on a next page. By way of example, after a recorded image on the first page is completed by carrying out the lower end process shown in FIG. 18, the sub-scan is carried out by a large feeding amount corresponding to the size of the whole print head. This enables the recording procedure to resume on a $1^{st}$ raster line in a next page, which is located immediately below the image on the first page, according to the upper end process shown in FIG. 19. In the example of FIGS. 18 and 19, the print head has seven nozzles arranged at the nozzle pitch of four dots, so that the sub-scan by 25 raster lines is carried out on the boundary between adjoining pages.

The greater feeding amount of sub-scan generally results in the lower accuracy of feeding. In the conventional printer that carries out printing on a large-sized printing medium, the lower accuracy of feeding may cause the interval between a lower-most raster line in a certain page and an upper-most raster line in a next page to be significantly different from the interval between another pair of adjoining raster lines. This may cause banding to occur on the boundary between adjoining pages.

In the conventional technique of continuous printing, the banding also occurs in an area where the lower end process is carried out and an area where the upper end process is carried out. In order to complete an image with regard to each page without any margins, it is required to carry out the minute sub-scan of 1 raster line in the lower end process and the upper end process as shown in FIGS. 18 and 19. In the area of the minute sub-scan, a plurality of raster lines adjoining to one another may be formed by the same nozzle. In the example of FIG. 18, the four raster lines located on the lower end are all formed by the $7^{th}$ nozzle. In the example of FIG. 19, the four raster lines located on the upper end are all formed by the $1^{st}$ nozzle. In this case, if the $1^{st}$ nozzle or the $7^{th}$ nozzle has some displacement of the ink ejecting direction, for example, due to a mechanical error in manufacture, the positions of the four raster lines formed by the $1^{st}$ nozzle or the $7^{th}$ nozzle are misaligned collectively. Such misalignment is observed as the banding.

The conventional technique of continuous printing carries out the upper end process, the lower end process, and the minute sub-scan, since the conventional printing apparatus does not allow the print head to sub-scan across a boundary between adjoining pages. The printing process is carried out while the print data are being input successively. Irrespective of the continuous printing mode or the standard printing mode, it can not be determined whether or not a next page is present in the course of the printing process. In the case where the print head is sub-scanned across the boundary between adjoining pages, it may be required to feed the printing medium back in the reverse of the sub-scanning direction at the beginning of the printing process with regard to a next page. In the example of FIG. 16, the printable area is below the raster line where the $2^{nd}$ nozzle is located at the $1^{st}$ pass of the main scan. When the print head is allowed unconditionally to sub-scan across the boundary between adjoining pages, on completion of the printing operation in a certain page, the $2^{nd}$ nozzle is located below the first raster line in a next page where the printing process should start.

The conventional printing apparatus takes into account the above circumstances and carries out the sub-scan without allowing the print head to be located across the boundary between adjoining pages as shown in FIG. 17. In the vicinity of the boundaries in each page, the upper end process and the lower end process are accordingly carried out to implement the sub-scan by certain feeding amounts, which are different from the periodic variation of feeding amount in the other part of the page.

As described above, the banding, however, occurs on the boundary between adjoining pages, the area in which the upper end process is carried out, and the area in which the lower end process is carried out. The presence of the banding undesirably damages the picture quality of the resulting image in the case of continuous printing.

SUMMARY OF THE INVENTION

The object of the present invention is thus to prevent banding from occurring in the vicinity of a boundary between adjoining pages in a continuous printing mode, thereby improving the picture quality of a resulting printed image.

At least part of the above and the other related objects is attained by a print controller that generates print data to be supplied to a printer, wherein the printer includes a print head, which has a plurality of dot-forming elements arranged at a preset interval in a sub-scanning direction, and carries out main scan and sub-scan repeatedly, so as to print an image corresponding to the supplied print data on a printing medium. The predetermined image regards a plurality of pages arranged in series in the sub-scanning direction. The print controller includes: an input unit that inputs image data corresponding to the image, page division data that specifies division of each page, and an end-of data code representing an end of the image data; an instruction input unit that inputs an instruction of executing a printing operation in a continuous printing mode, which carries out printing without any margins set between adjoining pages; and a print data generation unit that generates the print data to be supplied to the printer. The print data generation unit has: a feed amount data generation unit that generates feed amount data, which causes the sub-scan to be repeated by a predetermined periodic variation of feeding amount, whether or not an image is completed in each page, when the continuous printing mode is specified; and a raster data generation unit that generates raster data, which specifies a state of dot creation by the print head on each pass of the main scan, based on the image data.

As the print data generated by the print controller of the present invention are output to the printer, the printer carries out both the main scan and the sub-scan based on the input print data and prints an image corresponding to the input print data.

In the conventional printing apparatus, formation of the image is concluded in each page as described previously. The conventional printing apparatus carries out the printing process while successively receiving the supply of image data. In the case where a specific signal is input in the end of the image data to specify a new page, a shift to the new page is implemented in response to the specific signal. It can not be determined whether or not a next page is present, based on the specific signal for specifying a new page. The conventional technique accordingly concludes formation of the image in each page, in order to enable the printing process to be completed in each page, irrespective of the presence or non-presence of a next page. As described previously, the upper end process and the lower end process are carried out in the vicinity of the boundaries of each page to implement the sub-scan by certain feeding amounts, which are different from the periodic variation of feeding amount in the other part of the page. This arrangement prevents the print head from being located across the boundary between adjoining pages, thereby avoiding the requirement that feeds the printing medium back in the reverse of the sub-scanning direction at the start of the printing operation of each page.

When the continuous printing is specified, the technique of the present invention, on the other hand, carries out the sub-scan by the predetermined periodic variation of feeding amount, whether or not formation of the image is concluded in each page. The sub-scan by such a periodic variation of feeding amount may cause the print head to be located across the boundary between adjoining pages. In such a case, the technique of the present invention supplies image data of each page according to the position of the dot-forming element and carries out the printing operation. The image data with regard to a current page is supplied to the dot-forming element that is located in the current page across the boundary between the adjoining pages, whereas the image data with regard to a next page is supplied to the dot-forming element that is located in the next page. In the case where no next page is present, the image data are supplied only to the dot-forming element that is located in the current page.

When the continuous printing is specified, the technique of the present invention prints an image with the predetermined periodic variation of feeding amount maintained, whether or not formation of the image is concluded in each page. This arrangement does not require the sub-scan by a significantly large amount on the boundary between adjoining pages. This arrangement does not conclude the printing process in each page, thereby not requiring the lower end process or the upper end process including the minute sub-scan. The technique of the present invention thus effectively prevents the banding from occurring on the boundary between adjoining pages and improves the picture quality of the resulting printed image. The arrangement of maintaining the predetermined periodic variation of feeding amount significantly facilitates the control of the printing procedure. The principle of the present invention is especially effective when an integrated, continuous image that is continuous across the boundary between pages is printed.

The technique of the present invention is effectively applicable to print individual images, which are divided by pages, continuously without any margins. An example of the applicable cases continuously prints a plurality of photographs on a long printing medium without any margins. This arrangement facilitates the control of the printing procedure. This arrangement does not require the upper end process or the lower end process, which generally lowers the efficiency of printing, thereby improving the printing rate.

The specification of the continuous printing is generally given to an extremely long printing medium, such as a roll of machine glazed paper. In the case where the size of the printing medium does not allow sufficient margins relative to an image printing area, the sub-scan to the vicinity of the terminal end of the printing medium may cause the significantly lower accuracy of feeding in some sub-scan mechanisms. In the case of continuous printing, on the other hand, the size of the printing medium generally allows sufficient margins relative to the image printing area. The present invention takes account of this characteristic of continuous printing and breaks the obsession that should not allow the print head to be located out of a predetermined size of the printing medium at least in the last page. This enables an improvement in picture quality, while ensuring the simplified printing procedure in the continuous printing mode. The simplified printing procedure naturally enhances the printing speed.

The predetermined periodic variation of feeding amount may be a fixed feeding amount, or may alternatively include two or more different feeding amounts which are periodically repeated. The periodic variation of feeding amount depends upon the number of the dot-forming elements and their pitch. In the arrangement of the present invention, the predetermined periodic variation of feeding amount may not be maintained strictly in all the area. A different feeding amount may, however, be adopted in a narrow area specified in advance.

In accordance with one preferable embodiment of the print controller, the feed amount data generation unit generates the feed amount data that represents a specific feeding amount of the sub-scan, which is adopted prior to the predetermined periodic variation of feeding amount in a first page among the plurality of pages, so as to enable the main scan without causing any dropout of a raster line in a certain area that is out of a main area, in which the predetermined periodic variation of feeding amount is adopted. The specific feeding amount is smaller than a mean feeding amount, which is calculated from the predetermined periodic variation of feeding amount.

This arrangement enables the upper end process to be carried out on the upper end of the first page like the conventional technique, thereby expanding the printable area on the upper end of the first page. The certain area in the above embodiment corresponds to an expanded area. The actual amount of feeding may be set arbitrarily according to the range of the certain area, the pitch of the dot-forming elements, and the number of passes of the main scan required to form each raster line.

In accordance with one preferable application of the present invention, the raster data generation unit, in the case of an input of the page division data, waits for an input of image data with regard to a next page following the page division data and then generates the raster data. In the case of an input of the end-of-data code, on the other hand, the raster data generation unit generates the raster data without waiting for further input of image data.

This arrangement enables the printing operation of the image to be performed appropriately, depending upon whether or not a next page is present after the boundary, when the print head is located across the boundary. The page division data and the end-of-data code may be any data structure, as long as they are explicitly distinguishable from general image data.

In accordance with another preferable application of the present invention, the print data generation unit sets a sufficiently large value, which is greater than the plurality of pages, to a size of the printing medium and subsequently generates the print data, when the continuous printing mode is specified.

This arrangement enables image data divided into a plurality of pages to be processed virtually as data of a single page. Setting a sufficiently large value to the size of the printing medium ensures the continuous printing according to the same procedure as that of the standard printing.

The printing apparatus of the present invention may be used exclusively for the continuous printing, or may alternatively be used for both the continuous printing and the standard printing. In accordance with one preferable embodiment of the present invention, the instruction input unit selectively inputs the instruction of executing the printing operation in the continuous printing mode and an instruction of executing a printing operation in a standard printing mode, which carries out printing with a margin set between adjoining pages. The feed amount data generation unit generates the feed amount data that represents a specific feeding amount of the sub-scan set in advance to enable the main scan to be performed without causing any dropout of a raster line in each page, in response to the instruction of executing the printing operation in the standard printing mode. The raster data generation unit generates the raster data with regard to each page, based on the image data input before the page division data.

This arrangement enables the standard printing with margins set for each page and the continuous printing to be carried out selectively, thereby improving the usability of the printing apparatus.

The present invention is also directed to a variety of printing apparatuses, each including the print controller having any one of the above configurations and the printer.

The printing apparatus may further include a reverse feeding unit that feeds back the printing medium, which has been fed excessively by a printing operation in a last page among the plurality of pages, in reverse of a printing direction to a certain position suitable for starting a next cycle of the printing operation.

As described previously, the technique of the present invention does not carry out the lower end process even in the last page of the image and performs the printing process with the predetermined periodic variation of feeding amount maintained. This may cause a specific area on the printing medium, which follows the last page, to be wasted. The reverse feeding unit feeds the excessively fed printing medium back and thereby enables the specific area, which is possibly wasted, to be used for a next cycle of printing. For example, the reverse feeding unit specifies the size of the specific area, which is possibly wasted, by the excess feed of sub-scan and feeds the printing medium back to a certain position suitable for a start of the next cycle of printing. In another example, the reverse feeding unit feeds the printing medium back to a state prior to the supply to the printing apparatus and supplies the printing medium again. The reverse feeding process may be performed on completion of printing an image or prior to a start of the next cycle of printing.

The present invention is further directed to a method corresponding to the print controller discussed above, a method corresponding to the printing apparatus discussed above, as well as a recording medium, on which a program for generating data to be supplied to the printer is recorded, the program itself, and a variety of other applications.

Typical examples of the recording medium include flexible disks, CD-ROMs, magneto-optic discs, IC cards, ROM cartridges, punched cards, prints with barcodes or other codes printed thereon, internal storage devices (memories like RAM and ROM) and external storage devices of the computer, and a variety of other computer readable media.

These and other objects, features, aspects, and advantages of the present invention will become more apparent from the following detailed description of the preferred embodiment with the accompanying drawings.

DESCRIPTION OF THE PREFERRED EMBODIMENT

A. Structure of Apparatus

Figure 1:
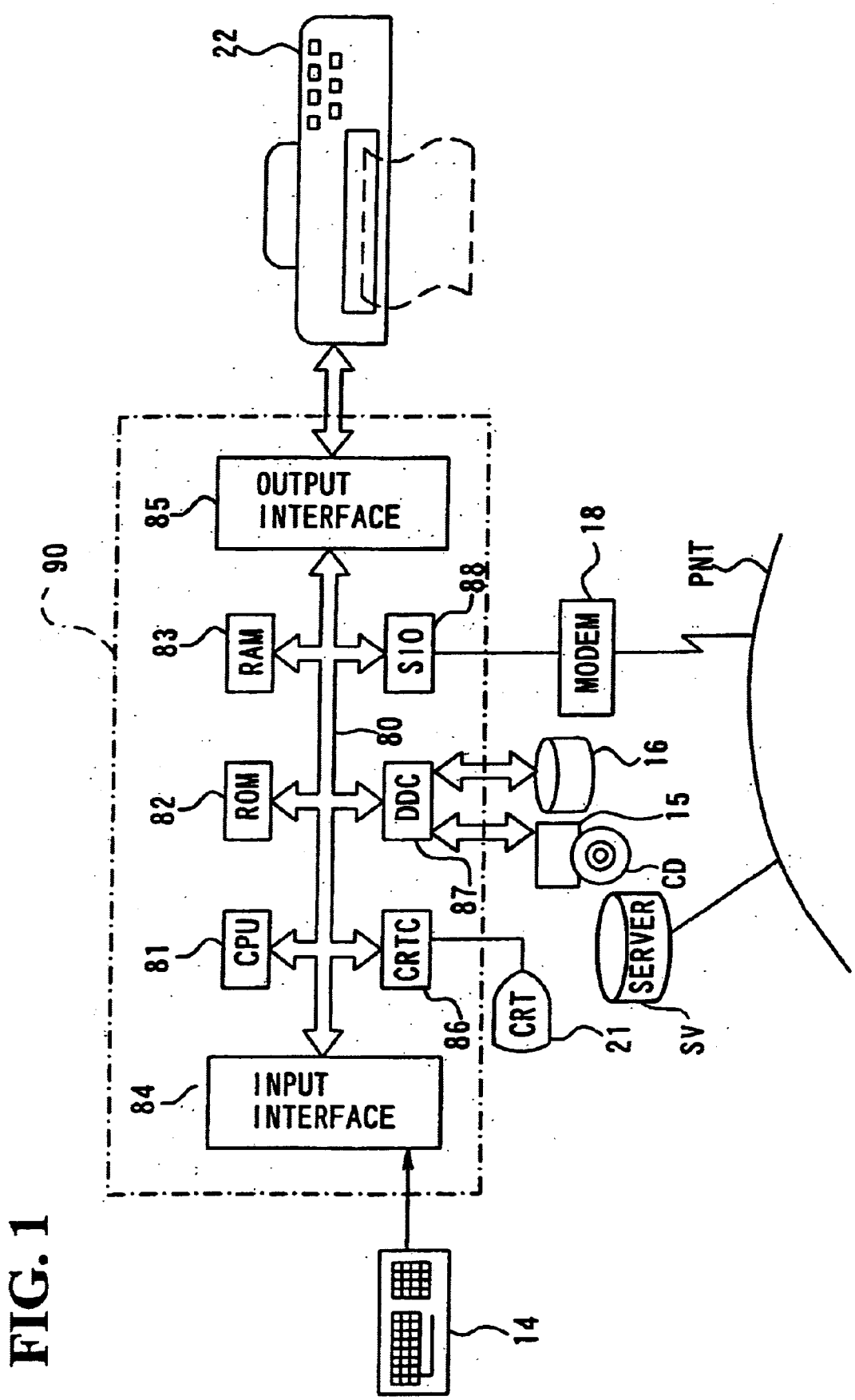
FIG. 1 is a block diagram schematically illustrating the structure of a printing apparatus as an embodiment according to the present invention.

FIG. 1 is a block diagram schematically illustrating the structure of a printing apparatus as one embodiment according to the present invention. The printing apparatus includes a computer 90 connected to a color printer 22. The computer 90 reads and executes predetermined programs to function as a print controller that controls the printer 22. The computer 90 includes a CPU 81 that executes a variety of operations according to the programs, a ROM 82, a RAM 83, and the following constituents mutually connected via a bus 80. An input interface 84 is in charge of inputting signals from a keyboard 14 and other input devices, whereas an output interface 85 is in charge of outputting data to the printer 22. A CRT controller (CRTC) 86 controls output of signals to a color CRT display 21. A disk drive controller (DDC) 87 controls transmission of data to and from a hard disk 16, a CD-ROM drive 15, and a flexible disk drive (not shown). A variety of programs loaded to the RAM 83 and executed as well as a variety of other programs provided in the form of a device driver are stored in the hard disk 16.

A serial input-output interface (SIO) 88 is also connected to the bus 80. The SIO 88 is connected to a modem 18 and further to a public telephone network PNT via the modem 18. The computer 90 is connected with an external network via the SIO 88 and the modem 18 and may gain access to a specific server SV to download a variety of programs into the hard disk 16. Another possible application reads the required programs from a flexible disk or a CD-ROM and causes the computer 90 to execute the input programs.

The printer 22 is an ink jet printer, which carries out both main scan and sub-scan to print an image. The main scan moves a print head, which has a plurality of nozzles for ejecting ink, forward and backward along a predetermined axis of printing paper. The sub-scan moves the print head relative to the printing paper in another direction that is perpendicular to the direction of the main scan. The detailed structure of the printer 22 will be discussed later. Raster data and feed amount data are output from the computer 90 to the printer 22 as print data. The raster data specify the pixels, in which dots are created by the respective nozzles in the course of each pass of the main scan, and the feed amount data specify the feeding amounts of sub-scan. The printer 22 performs the main scan and the sub-scan, based on the input print data.

B. Software Configuration

Figure 2:
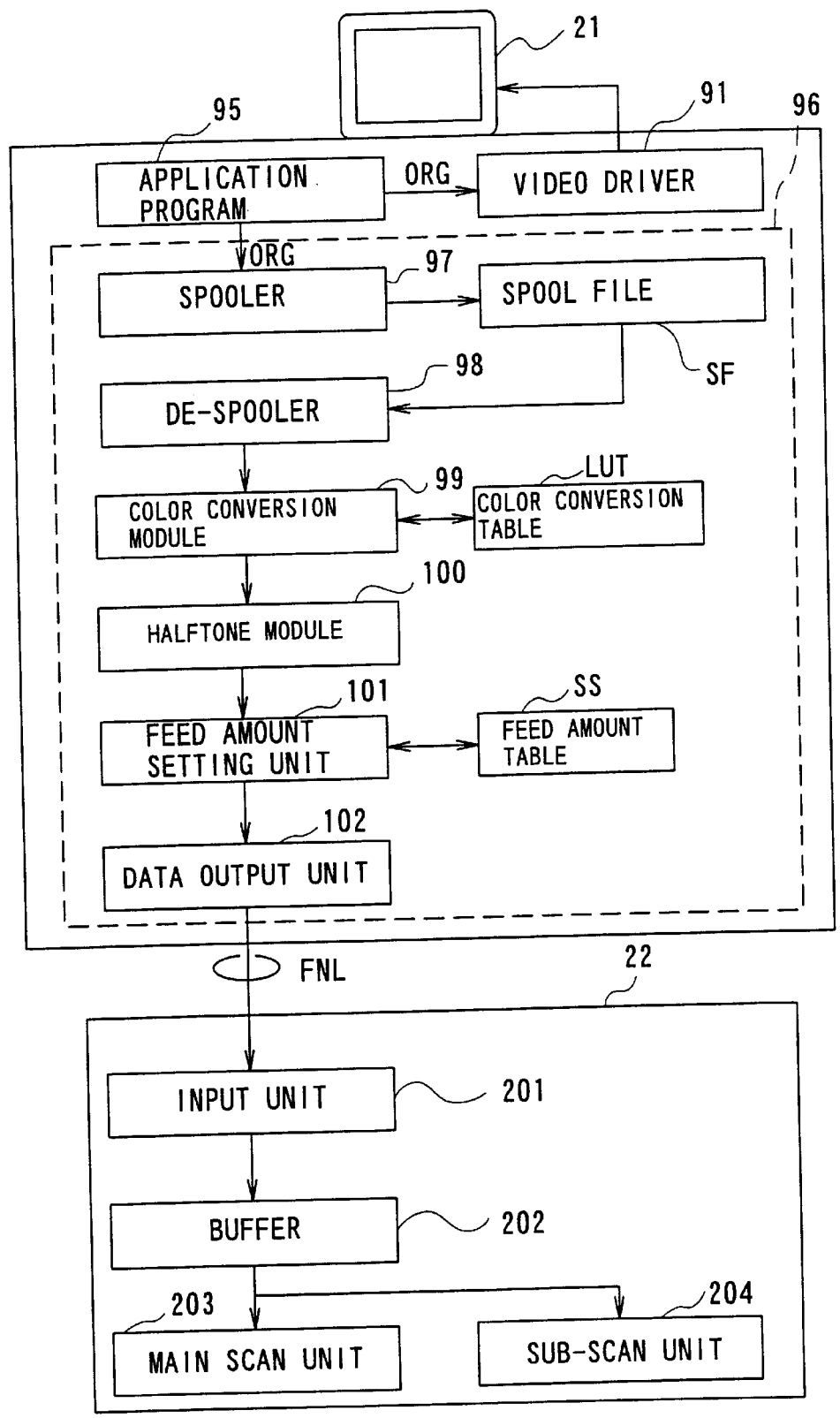
FIG. 2 is a block diagram illustrating a software configuration of the printing apparatus of the embodiment.

FIG. 2 is a block diagram illustrating a software configuration of the printing apparatus of the embodiment. The computer 90 executes an application program 95 on a specific operating system. A video driver 91 and a printer driver 96 are incorporated in the operating system. Image data ORG output from the application program 95 are processed by and transferred via the printer driver 96 as print data FNL to the printer 22. The application program 95 generates an image, which is to be printed on a large-sized printing medium, such as a banner, in response to an instruction input through the keyboard 14 or another input device. The application program 95 also causes an image corresponding to the image data ORG to be displayed on the CRT display 21 via the video driver 91. The image data ORG generated by the application program 95 consists of three color components, red (R), green (G), and blue (B).

In response to an instruction of printing given by the application program 95, a spooler 97 included in the printer driver 96 of the computer 90 receives the image data ORG as a set of drawing instructions from the application program 95 and stores the image data ORG into a spool file SF. The image data for a large-sized printing medium generated by the application program 95 are bulk in quantity and thus unable to be transferred at once to the printer driver 96. Because of the restriction on the operating system, the application program 95 divides the image data into pages of a predetermined size and successively transfers the divided image data to the printer driver 96. A de-spooler 98 included in the printer driver 96 carries out raster processing of the drawing instructions stored in the spool file SF and converts the drawing instructions to image data having the tone values of R, G, and B with regard to each pixel.

In addition to the spooler 97, the spool file SF, and the de-spooler 98, the printer driver 96 has a color conversion module 99, a halftone module 100, a feed amount setting unit 101, and a data output unit 102. The color conversion module 99 corrects the color components R, G, and B of the image data to color components expressible by the printer 22 (cyan, magenta, yellow, and black in this embodiment) by referring to a color conversion table LUT provided in advance. The printer 22 of this embodiment takes only a binary value, that is, either the dot-on state or the dot-off state, with regard to each pixel. The halftone module 100 accordingly sets the dot on-off state of each pixel, in order to enable the tone values of the corrected image data to be expressed by the dispersion of dots created by the printer 22.

The feed amount setting unit 101 sets feeding amounts of sub-scan according to the printing mode. The printing apparatus of this embodiment has two printing modes, that is, a continuous printing mode, in which one continuous image is printed on a large-sized printing medium, and a standard printing mode, in which images are printed on respective pages specified by the application program 95, as described later. Feeding amounts of sub-scan for each page corresponding to the selected printing mode have been registered in advance in a feed amount table SS. The feed amount setting unit 101 refers to this feed amount table SS and sets the feeding amounts of sub-scan corresponding to the selected printing mode. The feed amount setting unit 101 then detects the positions of the respective nozzles in the printer 22 and selects raster lines to be printed, based on the settings for the feeding amount of sub-scan.

The data output unit 102 rearranges the print data of the respective raster lines in the main scanning direction of the print head to a sequence of data output to the print head. The printer driver 96 outputs both the processed image data and the feed amount data, which specifies the feeding amounts of sub-scan, as the print data FNL to the printer 22.

In the printer 22, an input unit 201 receives the print data-FNL output from the computer 90 and temporarily stores the input print data into a buffer 202. The data in the buffer 202 are then output to a main scan unit 203. The main scan unit 203 ejects ink according to the print data, while carrying out main scan of the print head. As the main scan unit 203 forms raster lines, a sub-scan unit 204 feeds the printing paper by the amount of sub-scan specified by the printer driver 96. The input unit 201 successively inputs the print data FNL while the main scan unit 203 and the sub-scan unit 204 carry out the printing.

C. Structure of Printer

Figure 3:
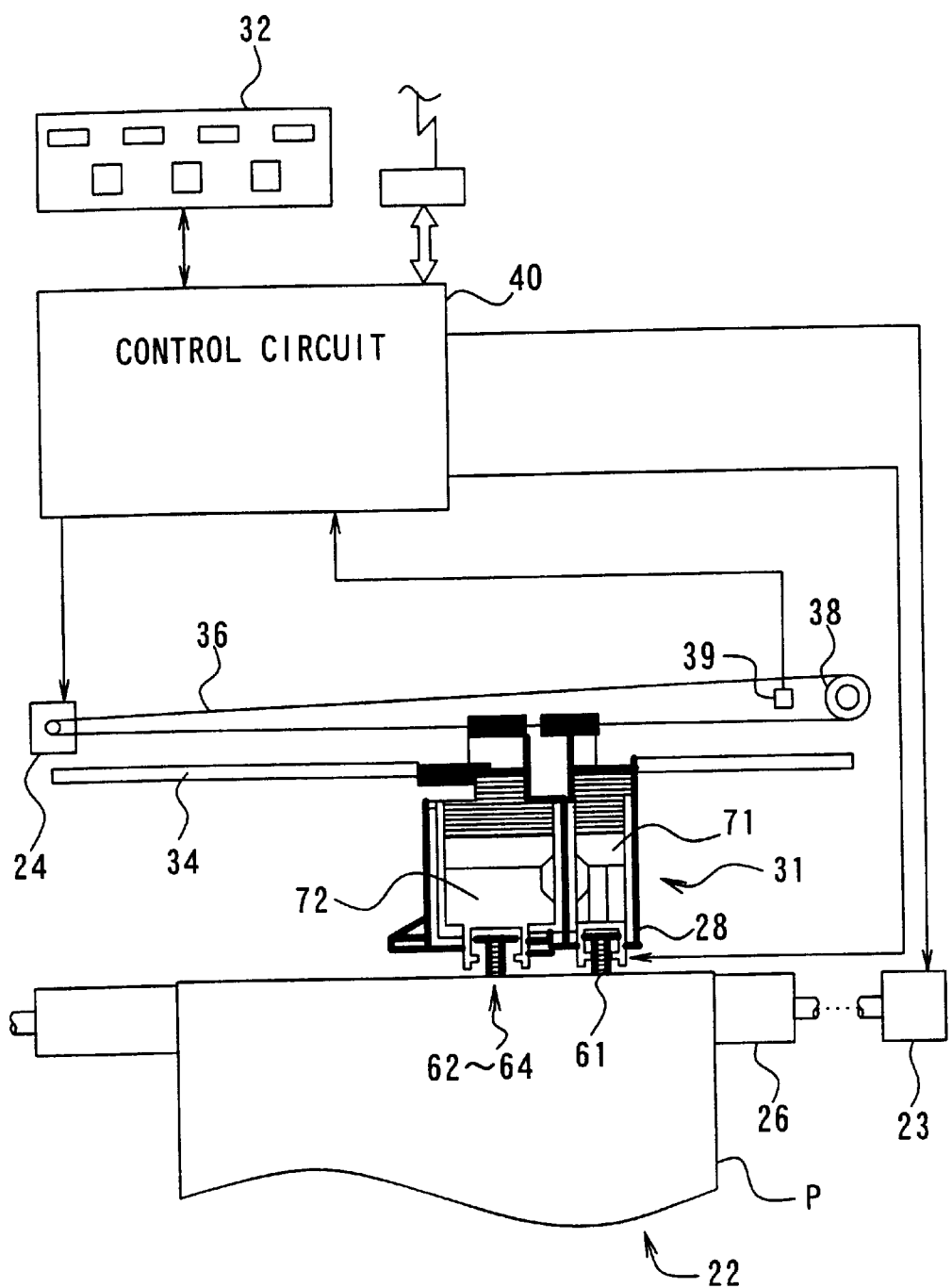
FIG. 3 schematically illustrates the structure of a printer included in the printing apparatus of the embodiment.

The schematic structure of the printer 22 used in this embodiment is described with referring to FIG. 3. As illustrated in FIG. 3, the printer 22 has a mechanism that feeds printing paper P by means of a sheet feed motor 23, a mechanism that moves a carriage 31 forward and backward along an axis of a platen 26 by means of a carriage motor 24, a mechanism that drives a print head 28 mounted on the carriage 31 to eject ink and create dots, and a control circuit 40 that controls transmission of signals to and from the sheet feed motor 23, the carriage motor 24, the print head 28, and a control panel 32.

The mechanism of reciprocating the carriage 31 along the axis of the platen 26 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 that detects the position of the origin of the carriage 31.

A black ink cartridge 71 for black ink (K) and a color ink cartridge 72 in which three color inks, that is, cyan (C), magenta (M), and yellow (Y), are accommodated may be mounted on the carriage 31 of the printer 22. A total of four ink ejection heads 61 through 64 are formed on the print head 28 that is disposed in the lower portion of the carriage 31. When the black ink cartridge 71 and the color ink cartridge 72 are attached downward to the carriage 31, supplies of inks can be fed from the respective ink cartridges 71 and 72 to the ink ejection heads 61 through 64.

The printer 22 of the embodiment may use a sheet of cut paper or a roll of machine glazed paper for the printing paper P. The roll of machine glazed paper is supported on a support unit and fed to the printer 22, although being not specifically illustrated here. When printing of the image is concluded, the user cuts the roll of machine glazed paper to a desired length. The cutting operation may alternatively be carried out by a mechanism that automatically cuts the roll of machine glazed paper at a specified position in response to a signal output from the control circuit 40. The printer of the embodiment can print a large-sized image over several ten meters using the roll of machine glazed paper.

Figure 4:
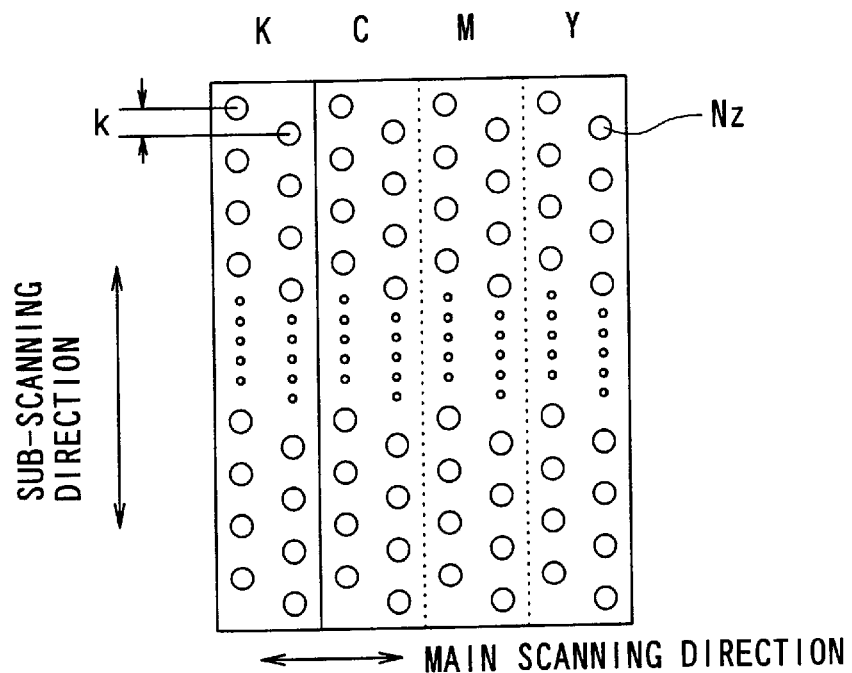
FIG. 4 shows an arrangement of nozzles on a print head of the printer.

FIG. 4 shows an arrangement of ink jet nozzles Nz in each of the ink ejection heads 61 through 64. The arrangement of nozzles shown in FIG. 4 includes four nozzle arrays, wherein each nozzle array ejects ink of each color and includes forty-eight nozzles Nz arranged in zigzag at a fixed nozzle pitch k. The positions of the corresponding nozzles in the respective nozzle arrays are identical in the sub-scanning direction. The nozzle pitch k is equal to 6 dots in this embodiment.

Figure 5:
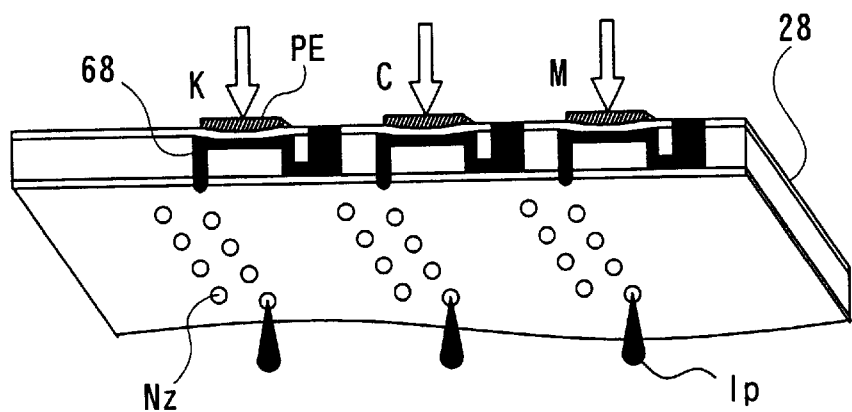
FIG. 5 shows the principle of creating dots.

The following describes the mechanism of ejecting ink and creating dots. FIG. 5 schematically illustrates the internal structure of the print head 28. For convenience of illustration, the ink ejection head for the yellow ink is omitted. A piezoelectric element PE is disposed corresponding to each of the forty-eight nozzles Nz formed on each of the ink ejection heads 61 through 64 at a position that comes into contact with an ink conduit 68 for leading ink to the nozzle Nz. FIG. 5 illustrates a configuration of the piezoelectric elements PE and the nozzles Nz. As is known by those skilled in the art, the piezoelectric element PE has a crystal structure that is subjected to mechanical stress due to application of a voltage and thereby carries out extremely high-speed conversion of electrical energy into mechanical energy. Application of a voltage between electrodes on both ends of the piezoelectric element PE for a predetermined time period causes the piezoelectric element PE to extend for the predetermined time period and deform one side wall of the ink conduit 68 as shown in FIG. 5. The volume of the ink conduit 68 is reduced with an extension of the piezoelectric element PE, and a certain amount of ink corresponding to the reduced volume is ejected as an ink particle Ip from the end of the nozzle Nz at a high speed. The ink particles Ip soak into the printing paper P set on the platen 26, so as to implement printing.

Figure 6:
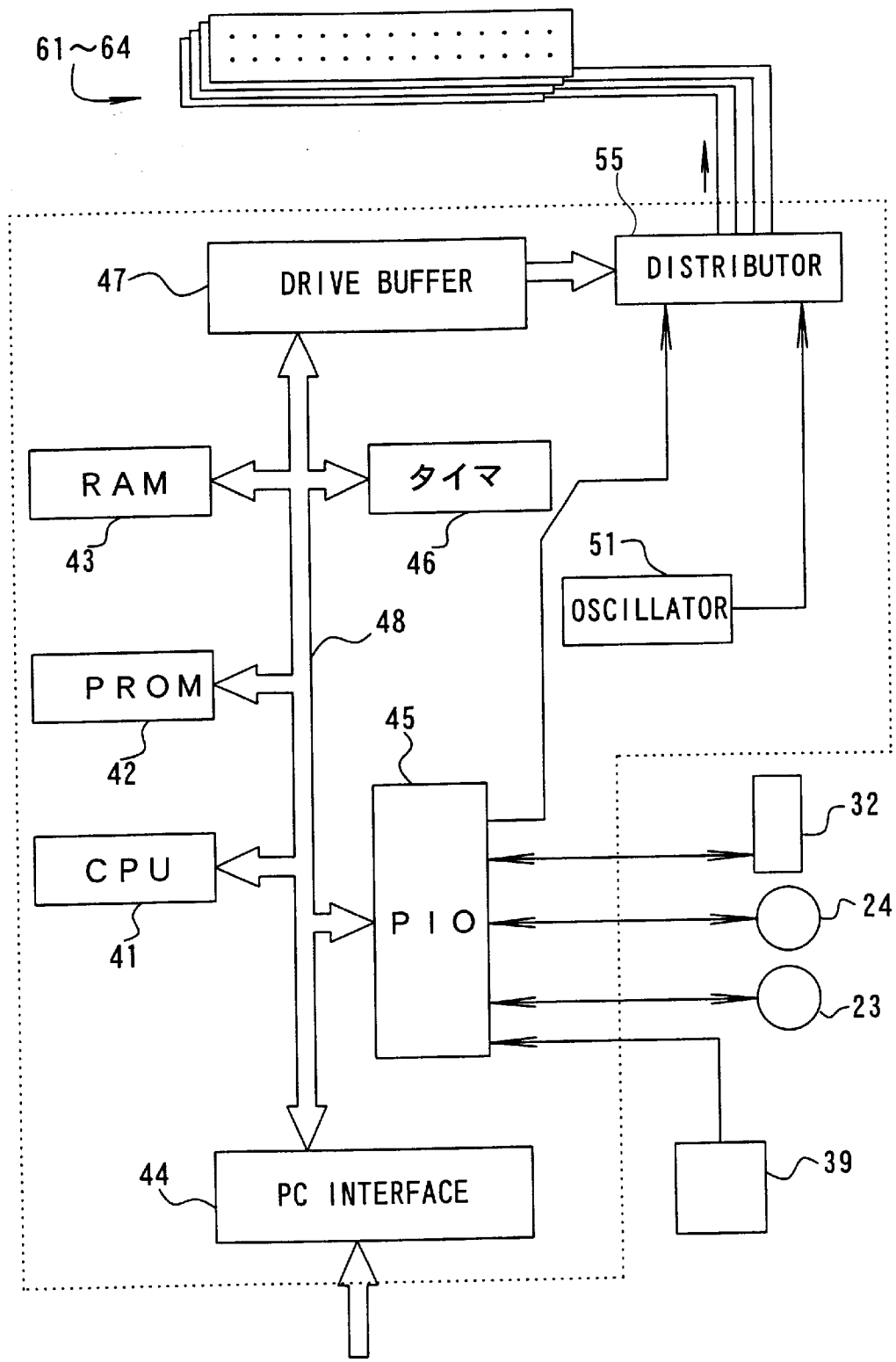
FIG. 6 shows the internal structure of a control circuit in the printer.

The internal structure of the control circuit 40 in the printer 22 is described with referring to FIG. 6. The control circuit 40 includes a CPU 41, a PROM 42, a RAM 43, a PC interface 44 that transmits data to and from the computer 90, a peripheral equipment input-output unit (PIO) 45 that transmits signals to and from the peripheral equipment, such as the sheet feed motor 23, the carriage motor 24, and the control panel 32, a timer 46 that counts the time, and a drive buffer 47 that outputs dot on-off signals to the ink ejection heads 61 through 64. These elements and circuits are mutually connected via a bus 48. The control circuit 40 further includes an oscillator 51 that outputs driving waveforms for driving the piezoelectric elements PE of the respective nozzles at selected frequencies and a distributor 55 that distributes the outputs from the oscillator 51 to the ink ejection heads 61 through 64.

The control circuit 40 receives the print data processed by the computer 90, temporarily stores the processed print data in the RAM 43, and outputs the print data to the drive buffer 47 at a preset timing. The drive buffer 47 outputs data representing the dot on-off state of the respective nozzles to the distributor 55. This arrangement enables the driving waveforms for driving the piezoelectric elements PE to be output to the nozzles Nz in the dot-on state, and thereby attains creation of dots.

In this embodiment, the printer 22 has the print head that uses the piezoelectric elements PE to eject ink as discussed above. The printer may, however, adopt another technique for ejecting ink. One alternative structure of the printer supplies electricity to a heater installed in an ink conduit and utilizes the bubbles generated in the ink conduit to eject ink.

The principle of the present invention may be applicable to various types of printers other than the ink ejection printers, for example, thermal transfer printers, sublimation printers, and dot impact printers.

D. Control of Printing

Figure 7:
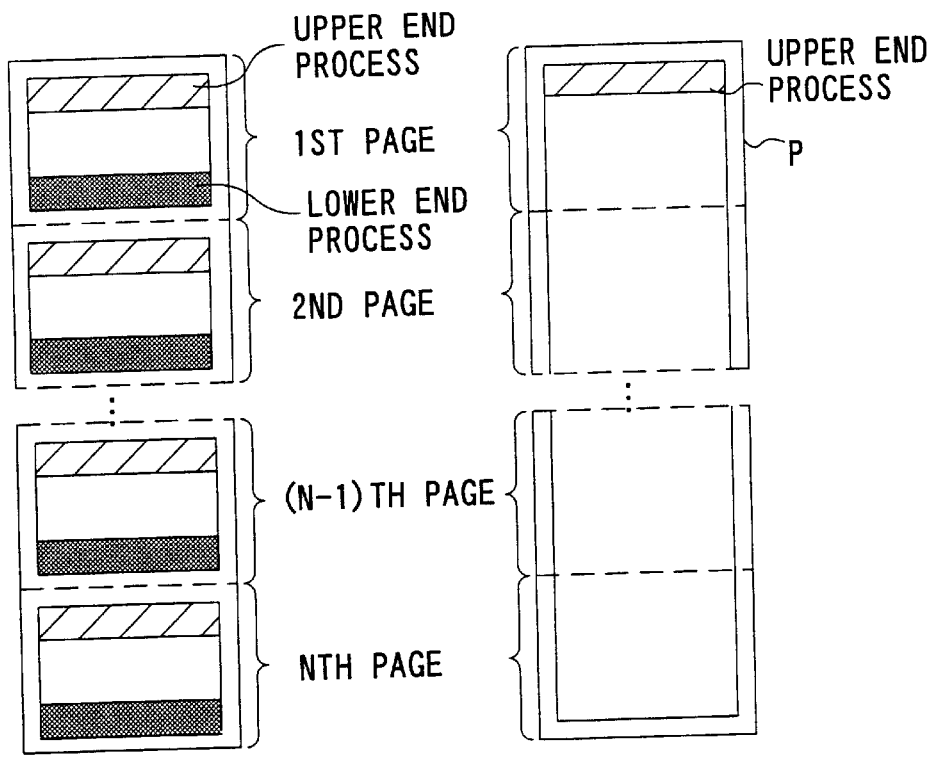
FIG. 7 shows the state of printing images in a standard printing mode and in a continuous printing mode.

The following describes a printing control process executed in this embodiment. The description regards the process that prints an image on a large-sized printing medium. The printing apparatus of this embodiment has two different printing modes, that is, a standard printing mode and a continuous printing mode. FIG. 7 shows a state of printing images in the standard printing mode on the left side. Images are printed via margins set between the respective adjoining pages in the standard printing mode. In order to expand the printable area, the upper end process and the lower end process are carried out with regard to each page. The details of the upper end process and the lower end process will be discussed later. FIG. 7 shows a state of printing an image in the continuous printing mode on the right side. In the continuous printing mode, one integrated image, which is transferred from the application program in a state of division into N pages (where N is an integer of not less than 2), is printed on the printing paper P without any margins between the adjoining pages. The upper end process is carried out in the upper end of the first page, where the printing procedure starts, in order to expand the printing area. Unlike the standard printing mode, the continuous printing mode does not carry out the lower end process in the respective pages or the upper end process in the second and subsequent pages.

The user of the printing apparatus may specify the printing mode. The continuous printing mode is selected when a large-sized image is generated by the application program. The CPU 81 in the computer 90 executes the application program. The CPU 81 divides the image data into a plurality of pages having a predetermined size and stores the divided image data with page size data into the RAM 83.

Figure 8:
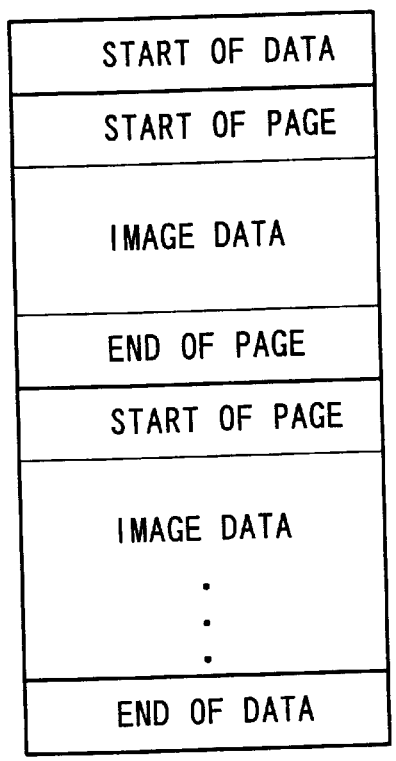
FIG. 8 shows the structure of a series of data transferred from an application program.

FIG. 8 shows the structure of a series of data transferred from the application program. A specific code representing 'start of data' is attached to the head of the series of data. The 'start of data' code is followed by a 'start of page' code representing the start of each page and image data corresponding to the page. An 'end of page' code is given to the end of each page. A specific code representing 'end of data' is attached to the end of the series of data. The data having such a data structure are output from the application program. At the time when the 'end of page' code is input, it can thus not be determined whether a next page is present or not. The 'start of page' code and the 'end of page' code are hereinafter collectively referred to as page division data.

Figure 9:
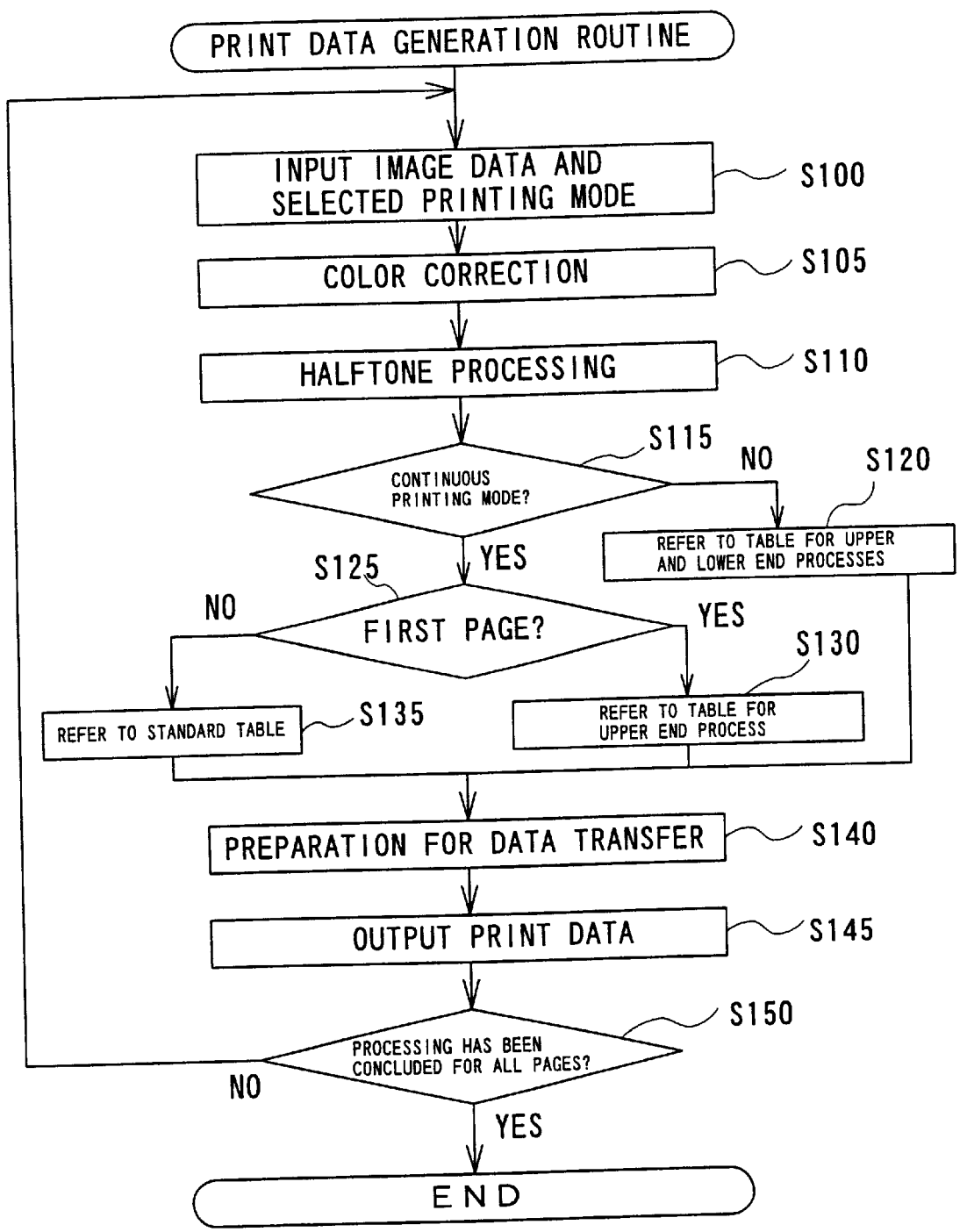
FIG. 9 is a flowchart showing a print data generation routine executed in the printing apparatus of the embodiment.

The CPU 81 also executes a printer driver program to drive the printer 22 and implement printing. The printer driver program is activated in response to a printing instruction from the application program. The flowchart of FIG. 9 shows a routine of generating print data, which is part of the processing by the CPU 81 to execute the printer driver program.

When the program enters the print data generation routine, the CPU 81 first inputs image data and the selected printing mode at step S100. The image data are divided into the respective pages as shown in FIG. 8 and expressed by the tone values of R, G, and B. The CPU 81 here inputs the page division data as well as the image data. The CPU 81 then carries out color conversion for the input image data at step S105. The process of color conversion corrects the R, G, and B color components for specifying the image data into color components C, M, Y, and K printable by the printer 22, with regard to each pixel. The color conversion process uses the color conversion table LUT, which specifies the C, M, Y, and K color components corresponding to each hue expressed by the R-G-B color system. The CPU 81 subsequently causes the color-converted image data to be subjected to the halftone processing at step S110. Any known method like the error diffusion method or the dither method is applicable for the halftone processing. The details of the color conversion and the halftone processing are known in the art and are thus not specifically described here.

Figures 10, 11:
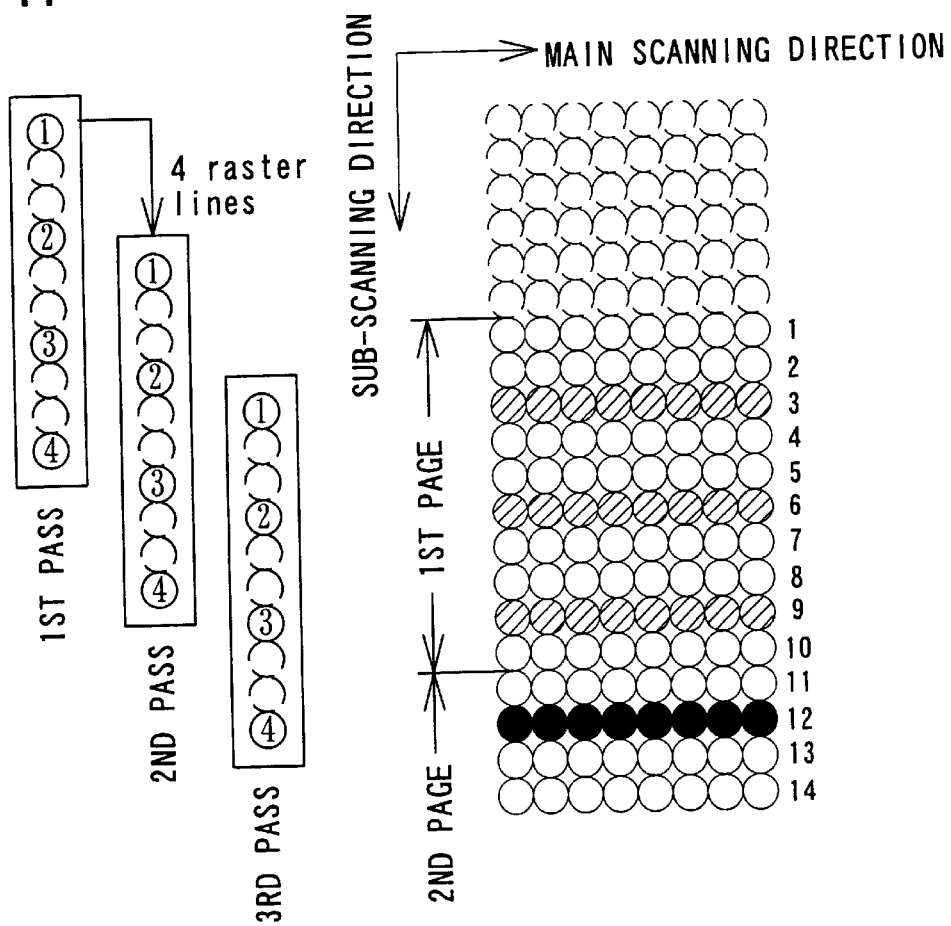
FIG. 10 shows the contents of feed amount tables used in the print data generation routine of FIG. 9.
FIG. 11 shows a process of extracting data to be transferred to the respective nozzles.

The CPU 81 carries out the processing that sets the feeding amounts of sub-scan in the printer 22 and extracts data to be transferred to the printer 22. In this embodiment, the feeding amounts of sub-scan corresponding to each printing mode have been stored in advance in the feed amount table SS. At step S115, the CPU 81 determines whether or not the continuous printing mode has been selected, before referring to the feed amount table SS. In the case where the continuous printing mode has not been selected, that is, when the standard printing mode is specified, the printing procedure is performed with the upper end process and the lower end process carried out with regard to each page as shown in FIG. 7. The CPU 81 accordingly refers to a table for upper and lower end processes, in which the feeding amounts of sub-scan are set on the premise that both the upper end process and the lower end process are carried out, at step S120. An example of the table for upper and lower end processes is shown in FIG. 10. The feeding amounts of sub-scan, which are successively used for printing on each page, are stored in the form of a one-dimensional table. The respective numerals represent the feeding amounts by the unit of raster lines. In the table for upper and lower end processes shown in FIG. 10, head data correspond to the feeding amounts for the upper end process, intermediate data correspond to the standard feeding amounts in the course of printing an image, and end data correspond to the feeding amounts for the lower end process.

In the case where the continuous printing mode has been selected, on the other hand, it is determined whether or not the image data currently processed are data regarding the first page at step S125. In the continuous printing mode, the printing process is performed with the upper end process carried out only in the first page as shown in FIG. 7. The CPU 81 accordingly refers to a table for upper end process at step S130. The upper end process is not carried out in the second and subsequent pages, so that the CPU 81 refers to a standard table at step S135. These tables are also shown in FIG. 10. In the table for upper end process adopted in the first page, head data correspond to the feeding amounts for the upper end process, and subsequent data correspond to the standard feeding amounts in the course of printing an image. In this example, the upper end process repeats the sub-scan of 3 raster lines seven times, before a shift to the standard feeding amounts. The standard table only stores the data corresponding to the standard feeding amounts. The standard feeding amount periodically varies as 5 raster lines, 2 raster lines, 3 raster lines, and 6 raster lines in this example.

After setting the amounts of sub-scan according to the selected printing mode as discussed above, the CPU 81 carries out extraction of data to be transferred to the printer 22. In a concrete procedure, the CPU 81 specifies the nozzles in the printer 22, which are expected to form the respective raster lines included in the image data, based on the preset feeding amounts of sub-scan, and extracts data of the raster lines.

FIG. 11 shows a process of extracting data to be transferred to the printer 22. The left portion of FIG. 11 shows the position of the print head in the sub-scanning direction on the $1^{st}$ through the $3^{rd}$ passes of the main scan. The encircled numerals represent the respective nozzles. In the illustrated example, four nozzles, that is, the $1^{st}$ through the 4th nozzles, are arranged at a nozzle pitch of three dots. In this example, the sub-scan by 4 raster lines is carried out after every pass of the main scan.

The right portion of FIG. 11 shows pixels, on which an image is formed. In the case where the sub-scan is carried out by the above feeding amount, there may be an area, in which raster lines are formed only intermittently in the sub-scanning direction. Namely the image can not be printed in the whole area. At the $1^{st}$ pass of the main scan, the image is printable in the area on and below the raster line where the $3^{rd}$ nozzle is located. The CPU 81 accordingly extracts and supplies the data of the $1^{st}$ raster line included in the image to the $3^{rd}$ nozzle, whereas extracting and supplying the data of the $4^{th}$ raster line to the $4^{th}$ nozzle. For the purpose of reference, numerals on the right-most column in FIG. 11 represent the raster line numbers allocated to the respective raster lines included in the image data. At the $2^{nd}$ pass of the main scan, the CPU 81 supplies the data of the $2^{nd}$ raster line to the $2^{nd}$ nozzle, the data of the $5^{th}$ raster line to the $3^{rd}$ nozzle, and the data of the $8^{th}$ raster line to the $4^{th}$ nozzle. In this manner, the CPU 81 extracts data of raster lines to be supplied to the respective nozzles by taking into account the amount of sub-scan.

In the continuous printing mode, the technique of this embodiment carries out the sub-scan by the fixed feeding amount and thereby allows the print head to be located across a boundary between adjoining pages. In the example of FIG. 11, at the $3^{rd}$ pass of the main scan, the $1^{st}$ through the $3^{rd}$ nozzles on the print head are located in the first page, whereas the $4^{th}$ nozzle is located in the second page. In this case, the data of the raster line to be supplied to the $4^{th}$ nozzle is extracted after the input of the image data with regard to the second page. As described previously with FIG. 8, the CPU 81 can not determine whether or not a next page is present at the time when an end-of-page code is input. The CPU 81 thus continues inputting data. In the event that a start-of-page code is input, the CPU 81 determines that a next page is present and waits for extraction of data of the raster line until input of a next set of image data. In the event that the end-of-data code is input, on the other hand, the CPU 81 determines that no next page is present and carries out extraction of data of the raster line without waiting for input of a next set of image data. In the latter case, only mask data that implies no creation of dots are given to part of the nozzles on the print head.

Referring back to the print data generation routine shown in the flowchart of FIG. 9, the CPU 81 rearranges the extracted data, which are to be supplied to the respective nozzles, to a sequence of data actually transferred to the printer 22 and implements preparation for data transfer at step S140. For example, in the case where an image is printed by bi-directional recording, that is, by both the forward pass and the backward pass of the main scan, the data array is inverted according to the direction of the main scan. In the case of overlap recording that forms each raster line with two nozzles, data are rearranged in such a manner that data of odd-positioned pixels are supplied to one nozzle and data of even-positioned pixels are supplied to the other nozzle. With regard to the nozzle that creates dots only in the odd-numbered pixels, mask data are given to the even-numbered pixels.

The CPU 81 outputs the data regarding the feeding amount of sub-scan and the rearranged data as print data to the printer 22 at step S145. The CPU 81 repeats the series of the processing of steps S100 through S145 until it is determined that the processing has been concluded for all the pages at step S150. Although all the image data with regard to each page are input at step S100 in the procedure of this embodiment shown in FIG. 9, the image data with regard to each page may be input successively by some divisions, while the color conversion and the halftone processing are carried out.

Figure 12:
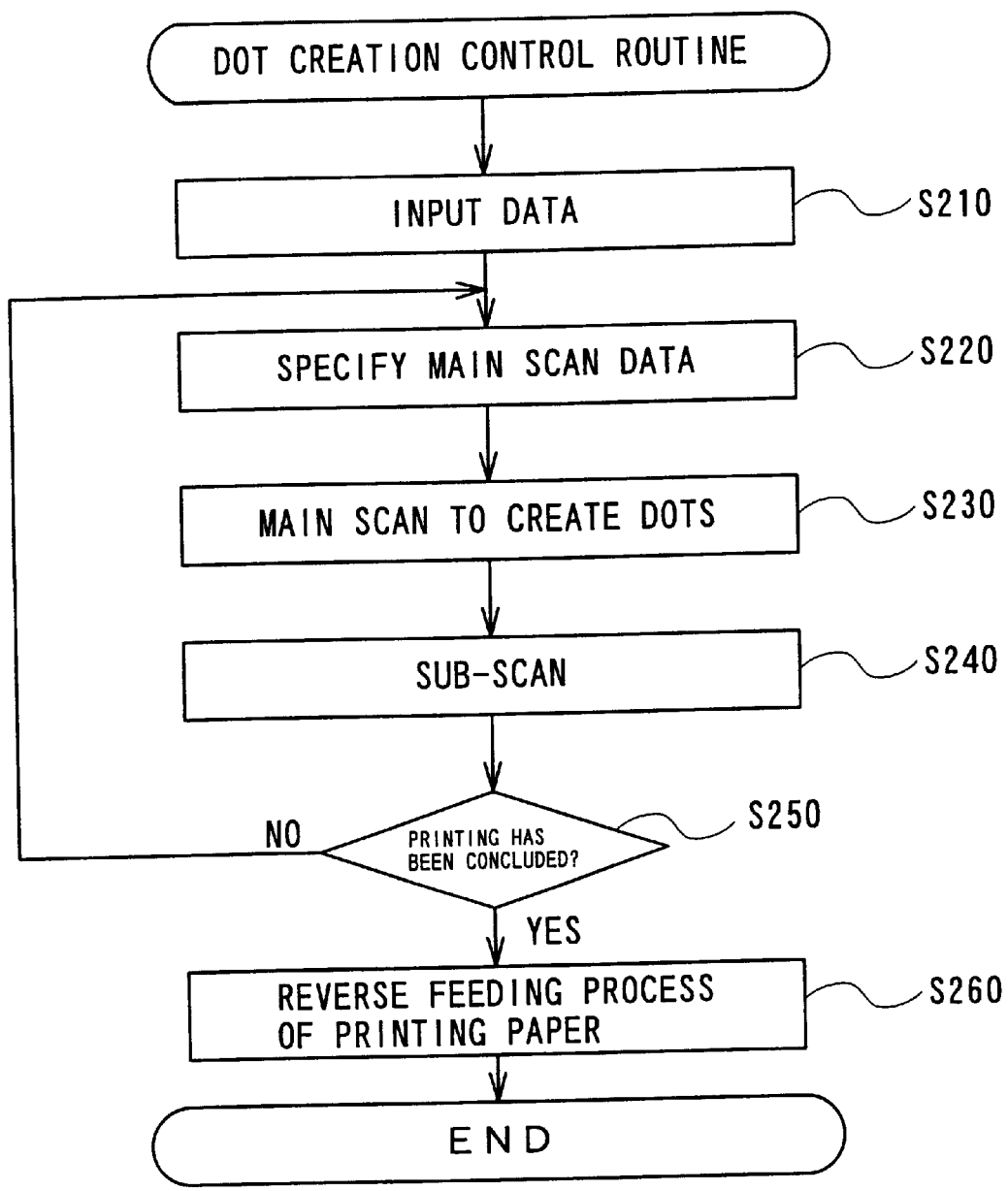
FIG. 12 is a flowchart showing a dot creation control routine executed in the printing apparatus of the embodiment.

The printer 22 carries out printing, based on the feed amount data and the print data output from the computer 90 as a result of the above processing. The flowchart of FIG. 12 shows a dot creation control routine to implement the printing process. The CPU 41 included in the control circuit 40 of the printer 22 executes this routine.

When the program enters the routine of FIG. 12, the CPU 41 first inputs data at step S210. The input data here include the print data, which have been obtained as a result of the halftone processing carried out in the printer driver 96, and the data regarding the feeding amounts of sub-scan. The CPU 41 stores the input data into the RAM 42 and transfers data of the raster lines, which are to be formed at a next pass of the main scan, to the drive buffer 47, thereby specifying the main scan data at step S220. While carrying out each pass of the main scan, the CPU 41 drives the print head and creates dots at step S230. On completion of each pass of the main scan, the CPU 41 carries out the sub-scan by a feeding amount specified by the printer driver 96 at step S240. In the standard printing mode, the sub-scan is carried out by a certain feeding amount that implements a shift to a new page, in response to an input of page division data. In the continuous printing mode, on the other hand, the periodical variation of the feeding amount is maintained, even when the page division data is input to show a boundary between adjoining pages. The series of the processing of steps S210 through S240 is repeated until it is determined that printing has been concluded at step S250. On completion of printing a resulting image, the printing paper, on which the image is printed, is subjected to a reverse feeding process at step S260. Namely the printing paper is fed in the reverse of the sub-scanning direction for the next cycle of printing. The details of the reverse feeding process will be discussed later.

E. Process of Dot Creation

Figure 13:
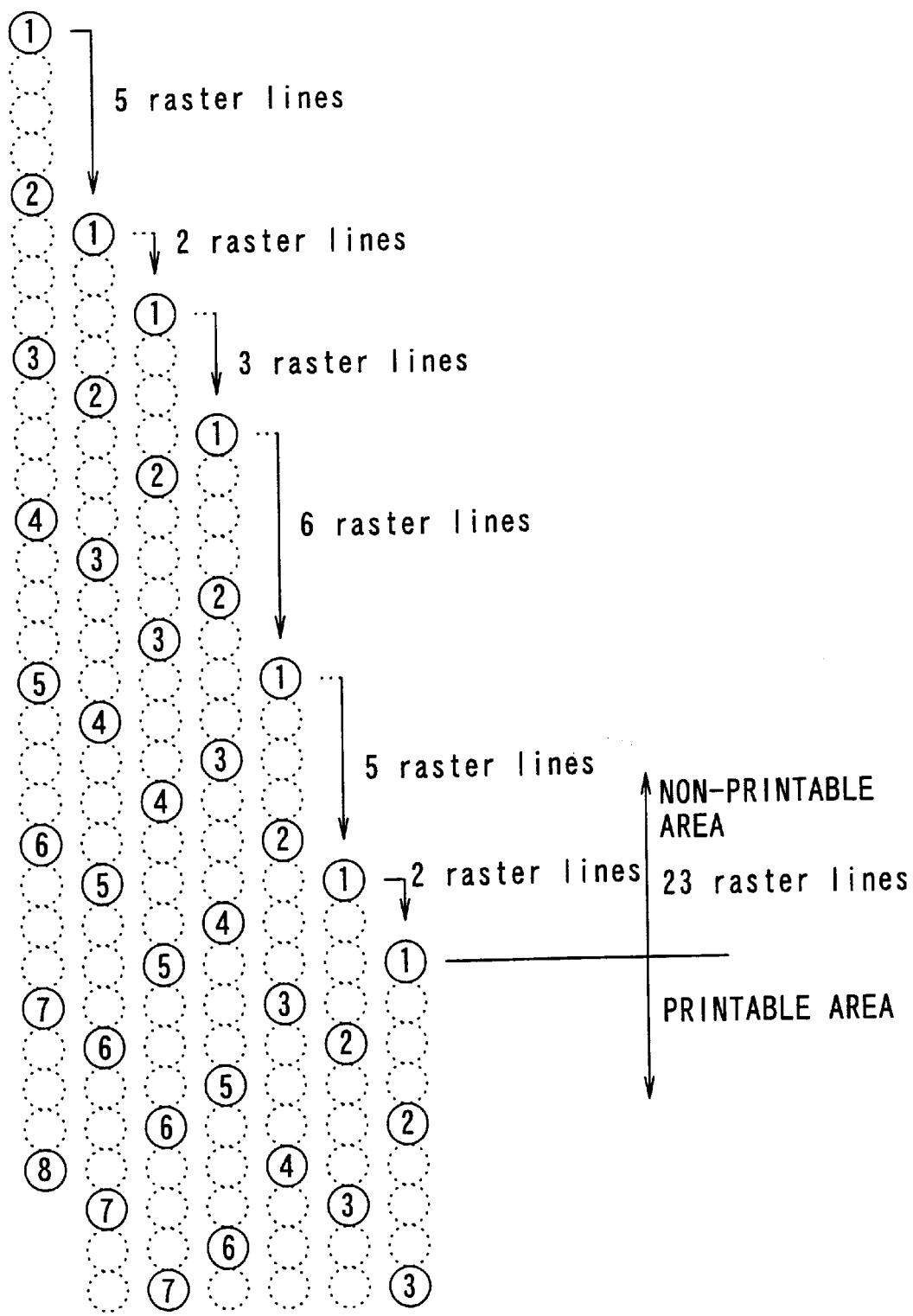
FIG. 13 shows the state of recording dots without the upper end process.

FIG. 13 shows a process of dot creation in this embodiment. The standard feeding amounts are adopted in the dot creation process of FIG. 13. In the illustrated example, the print head has eight nozzles arranged at a nozzle pitch of four dots. The standard feeding amount periodically varies as 5 raster lines, 2 raster lines, 3 raster lines, and 6 raster lines as shown in the feed amount table of FIG. 10. The periodical variation of the feeding amount enables the overlap recording that forms each raster line by two passes of the main scan. In a printable area shown in FIG. 13, each raster line is formed with two nozzles. When this periodical variation of the feeding amount is adopted from the beginning of the printing process, there is a non-printable area of 23 raster lines before each raster line is formed by two passes of the main scan as shown in FIG. 13.

Figure 14:
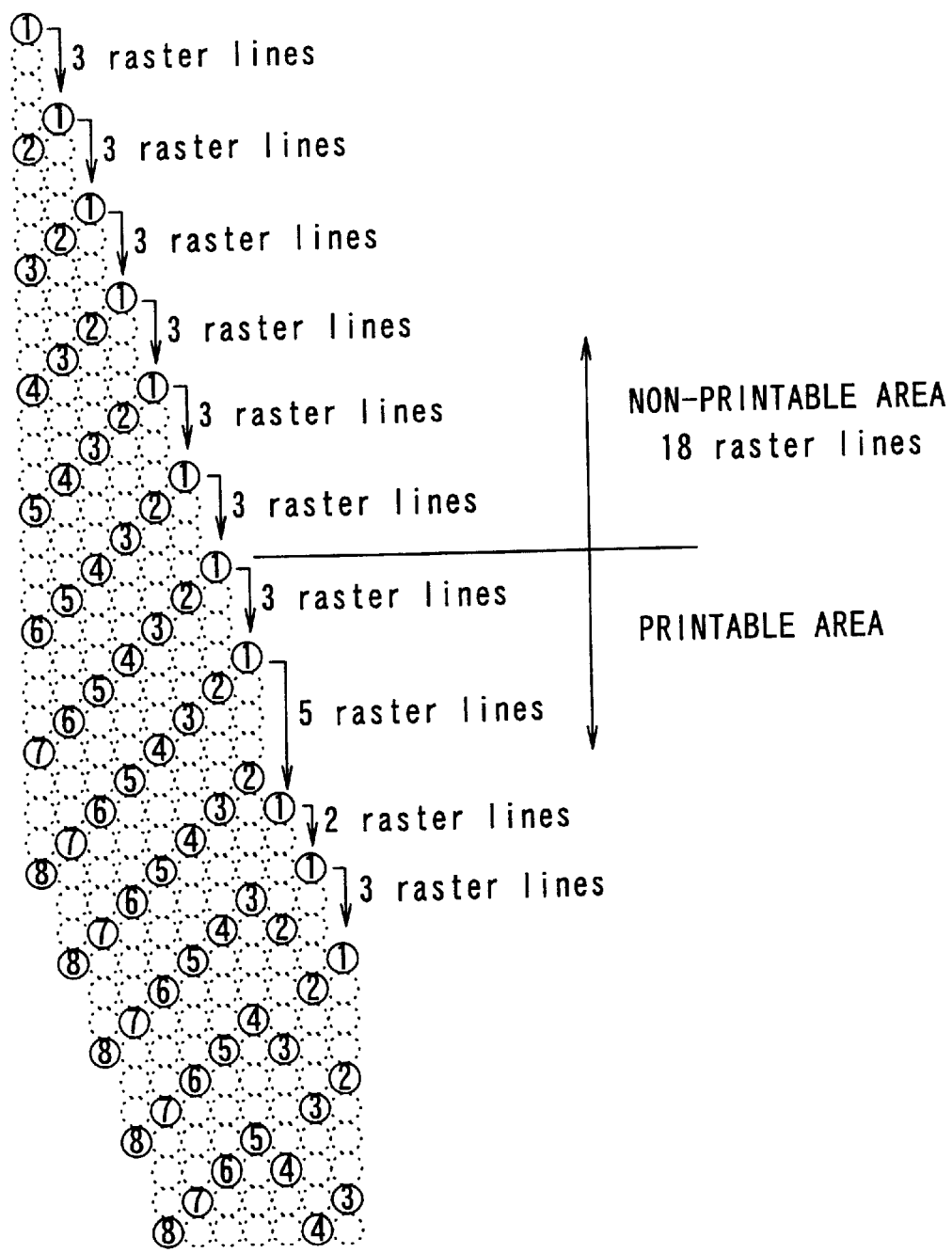
FIG. 14 shows an example of the upper end process.

In the continuous printing mode, the upper end process is carried out in the first page to expand the printable area. FIG. 14 shows an example of the upper end process. The number of nozzles and the nozzle pitch in FIG. 14 are identical with those in FIG. 13. The upper end process repeats the sub-scan of 3 raster lines seven times, before a shift to the standard feeding amounts. The upper end process by this feeding amount desirably reduces the non-printable area to 18 raster lines, before the overlap recording that forms each raster line by two passes of the main scan, as shown in FIG. 14. Compared with the case without the upper end process, the printable area is expanded by 5 raster lines. Various values may be set to the feeding amount and the frequency of sub-scan for the upper end process, according to the number of nozzles provided on the print head and the nozzle pitch. The upper end process may not be carried out if desirable.

As described previously, in the standard printing mode, the lower end process is carried out for each page. Although an example of the lower end process is not specifically described here, the feeding amounts shown in FIG. 10 are adopted to expand the printable area on the lower end of each page by several raster lines, in the same manner as the upper end process.

Figure 15:
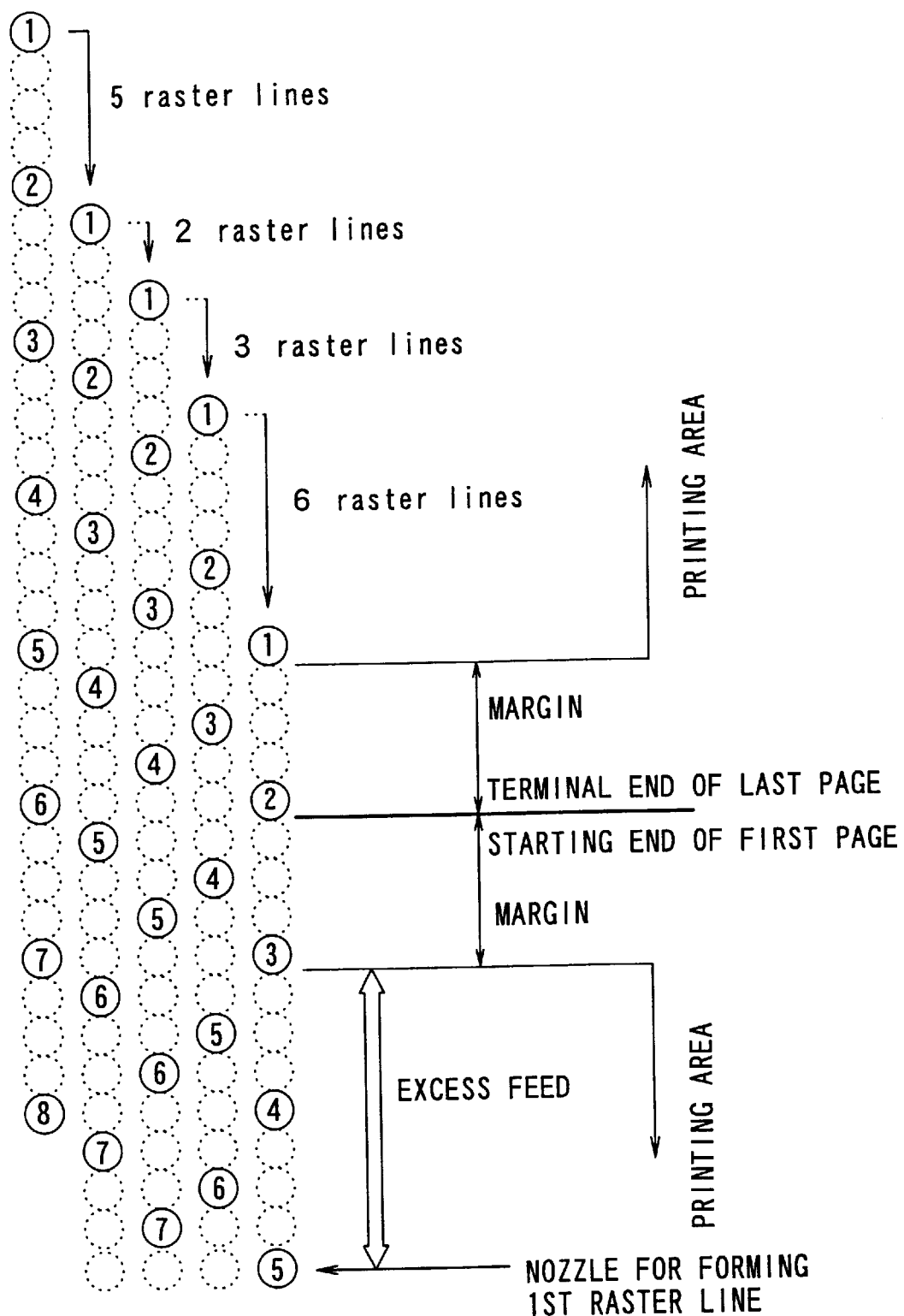
FIG. 15 shows the position of the print head in the course of the printing operation with regard to a last page.
Figure 16:
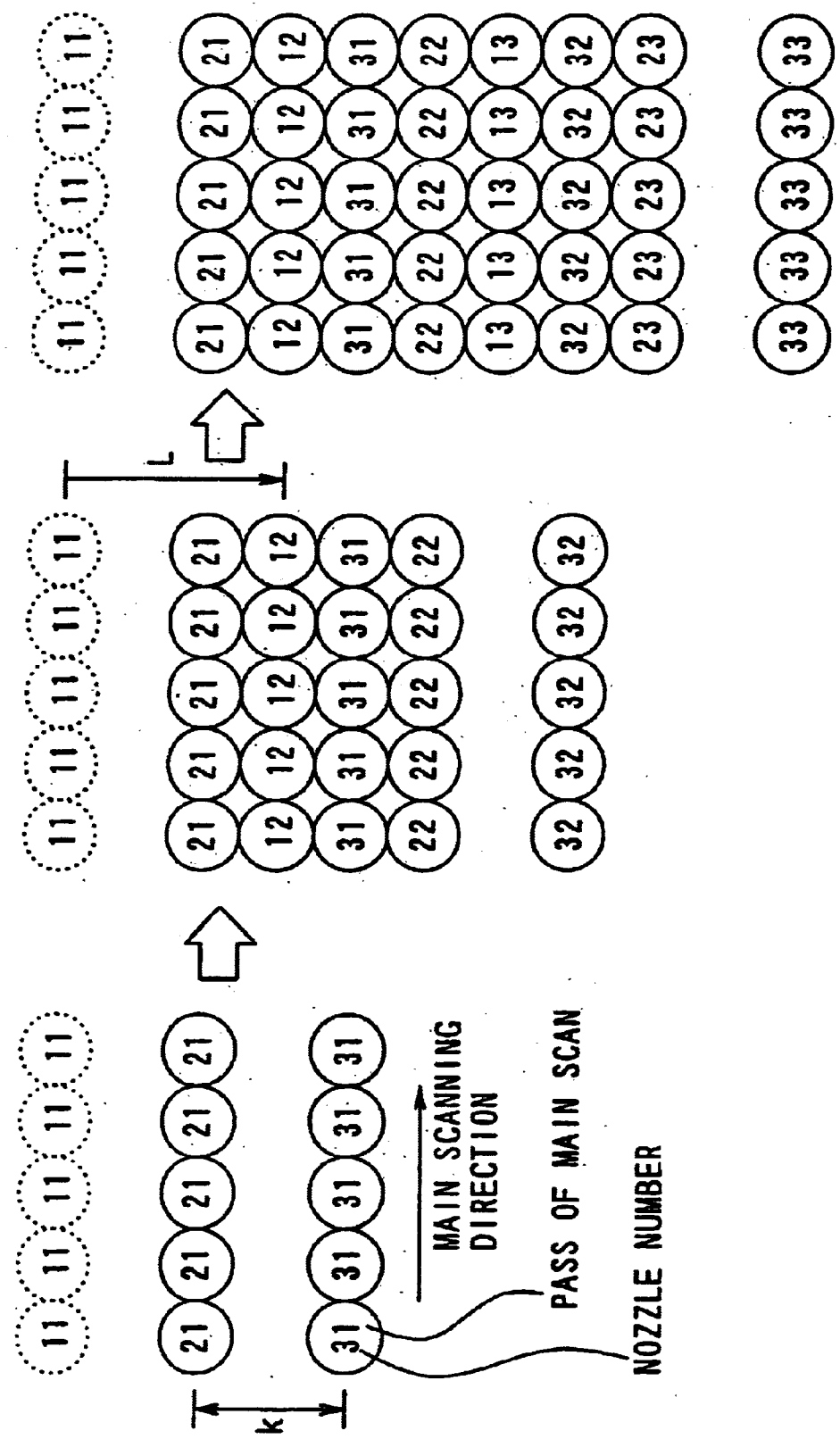
FIG. 16 shows the state of recording dots according to the interlace process.
Figure 17:
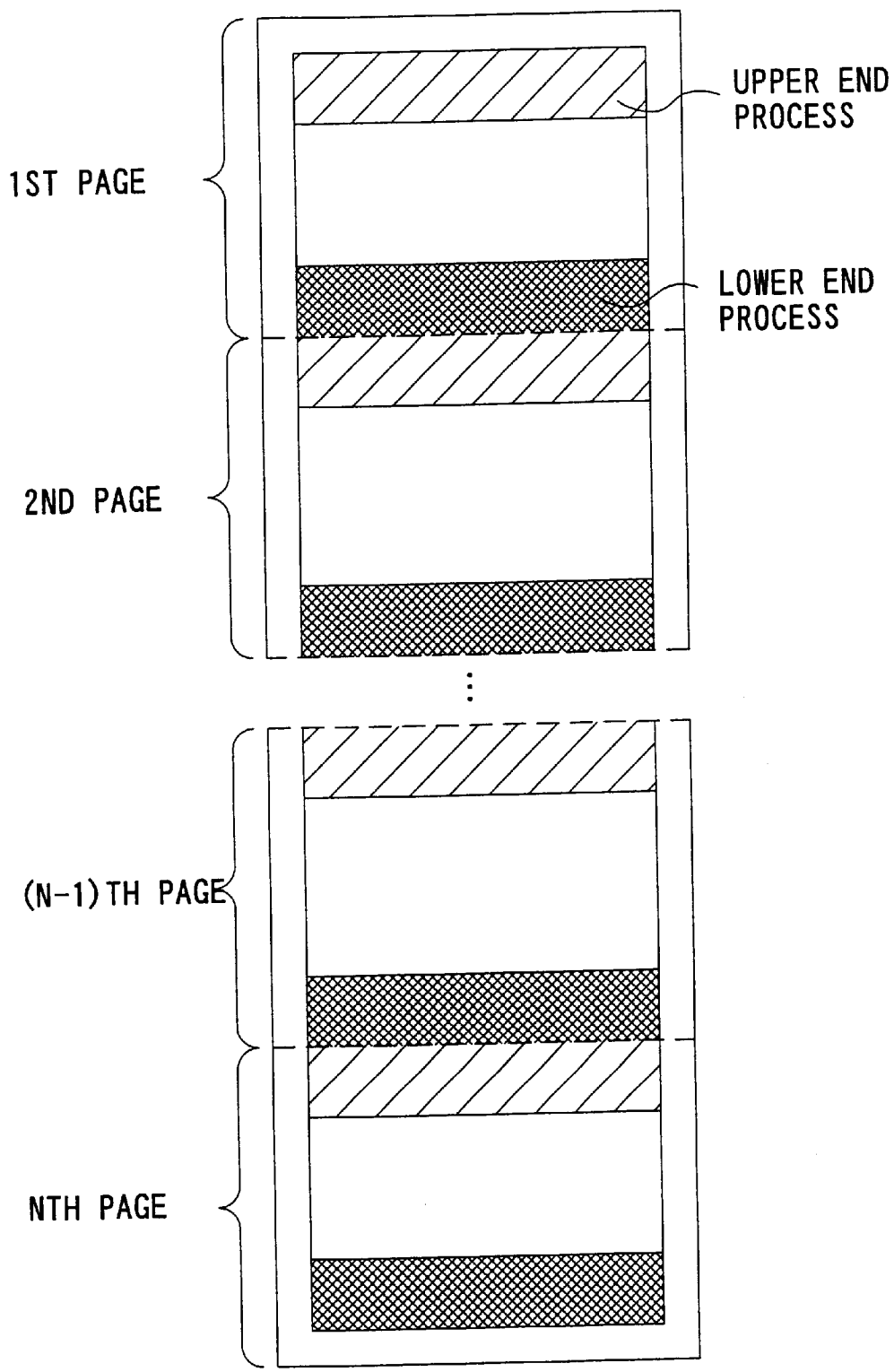
FIG. 17 shows a state of continuous printing by the conventional technique.
Figure 18:
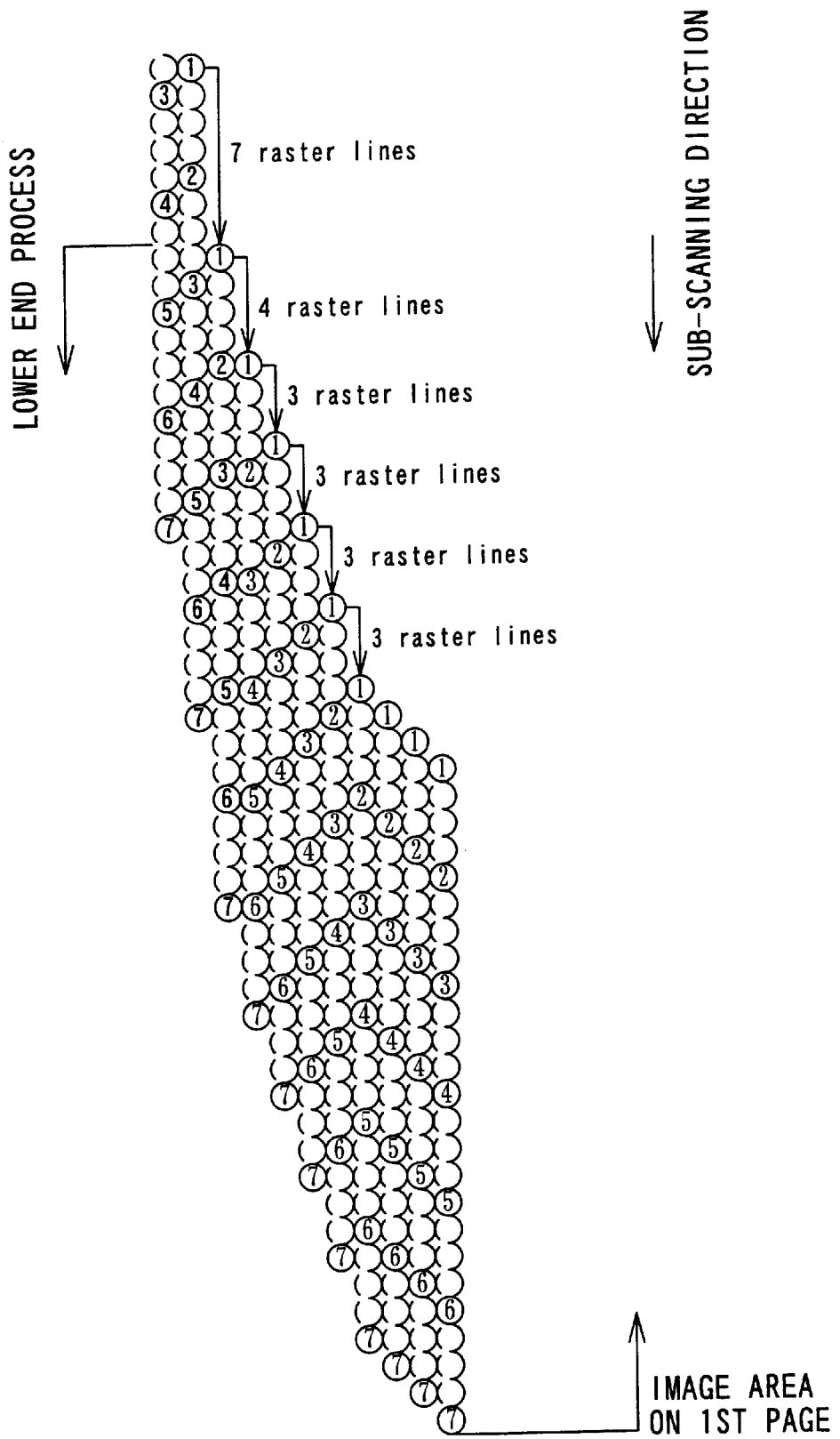
FIG. 18 shows an example of the lower end process in the conventional printing procedure in the continuous printing mode.
Figure 19:
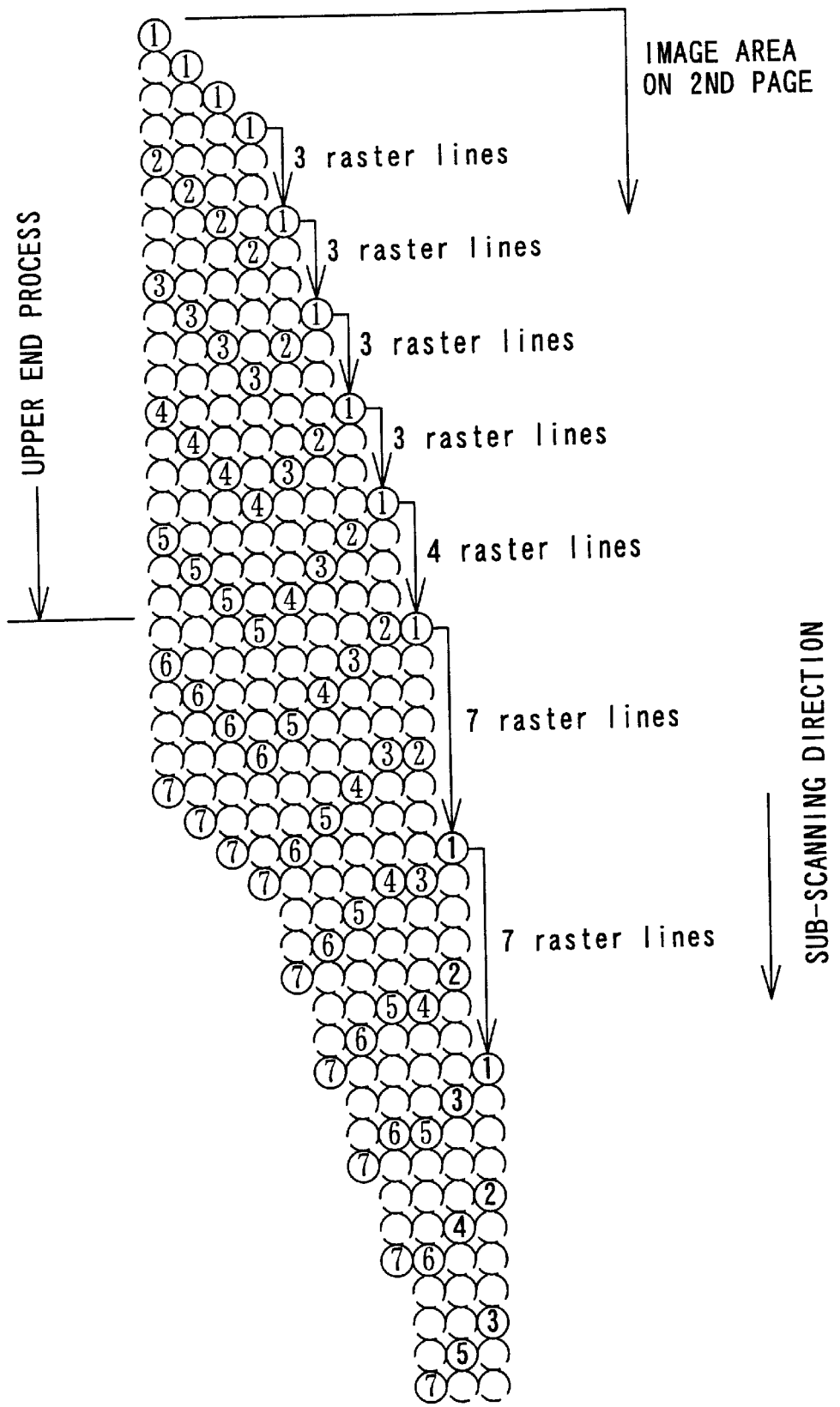
FIG. 19 shows an example of the upper end process in the conventional printing procedure in the continuous printing mode.

The reverse feeding process of the printing paper is described with reference to FIG. 15. As described previously, the printer 22 does not carry out the lower end process even in the last page but performs printing by the standard feeding amounts. FIG. 15 shows the state of the last page when the printing process is carried out with the standard feeding amounts maintained. The symbols in FIG. 15 have the same meanings as those of FIGS. 13 and 14.

In the illustrated example, it is assumed that a specific area up to the raster line where the $1^{st}$ nozzle is located at the last pass of the main scan is a printing area of the image. For convenience of illustration, the nozzle positions in the previous passes of the main scan are not sufficiently shown in FIG. 15. As clearly understood from FIG. 13, however, the periodical variation of the standard feeding amount enables an image to be printed in the printing area shown in FIG. 15.

At the time when printing of an image on the last page has been completed, a most part of the print head is located below the printing area as shown in FIG. 15. In some cases, the lower end of the print head exceeds the terminal end of the last page and is located in a printing area of a first page in the next cycle of printing as shown in FIG. 15. In the case where the upper end process is not carried out in the first page as shown in the example of FIG. 13, the $5^{th}$ nozzle forms the $1^{st}$ raster line. In this case, the printing operation with regard to the last page with the periodical variation of the standard feeding amount maintained causes an excess feed shown in FIG. 15. The printer 22 thus carries out the reverse feeding process to feed the printing paper back in the reverse of the sub-scanning direction by an amount corresponding to the excess feed. The reverse feeding process of the printing paper may be carried out by calculating the amount of excess feed and feeding the printing paper back by the calculated amount. Alternatively the reverse feeding process may once remove the printing paper completely from the sheet feed mechanism and then feed the printing paper again.

F. Effects of Embodiment and Modification

The printing apparatus of the embodiment discussed above prints an image with the periodic variation of the feeding amount maintained even on the boundary between adjoining pages in the continuous printing mode. This arrangement enables the image part on the boundary to have an equivalent picture quality to that of the other portion of the image. Namely this arrangement effectively prevents the banding from occurring on the boundary between adjoining pages and thereby improves the picture quality of the resulting image. The arrangement of maintaining the periodic variation of the feeding amount even on the boundary desirably facilitates the control of the printing procedure.

The printing apparatus of the embodiment maintains the periodic variation of the feeding amount even in the last page. This causes an excess feed shown in FIG. 15. The reverse feeding process compensates for the excess feed after completion of the printing operation, thereby preventing the printing paper from being wasted. This reverse feeding process is, however, not essential in the arrangement of the above embodiment. In the case where some waste of the printing paper is negligible, the printing apparatus may be designed not to perform this reverse feeding process.

In accordance with one possible modification, the printing apparatus may neglect the page division data and carry out the printing operation in the continuous printing mode. In this case, the image data divided into a plurality of pages and supplied from the application program are processed like data of a single page. When the continuous printing mode is selected, printing may be carried out while the printer driver sets a sufficiently large size of printing paper in advance, irrespective of the size of the printing paper specified by the application program. This enables the continuous printing by a relatively simple procedure. In accordance with a concrete application, the procedure changes the size of the printing paper to a sufficiently large value between the processing of step S115 and the processing of step S120 in the flowchart of FIG. 9.

In the printing apparatus of the embodiment discussed above, the computer executes the processing shown in the flowchart of FIG. 9. The principle of the present invention may thus be actualized by a recording medium, on which the program for executing the processing is recorded. The CPU 41 included in the control circuit 40 of the printer 22 may alternatively carry out the print data generation routine shown in FIG. 9.

In the above embodiment, the printer driver 96 receives image data representing a long continuous image, which has once been divided into a plurality of pages for the purpose of the processing, to be printed on a large-sized printing medium, such as a banner, and causes a resulting image to be printed continuously without setting any margins between adjoining pages. The technique of the present invention is, however, also applicable for the case in which image data representing a plurality of individual images, which are originally divided by pages, are printed in the continuous printing mode.

The present invention is not restricted to the above embodiment or its modifications, but there may be many other modifications, changes, and alterations without departing from the scope or spirit of the main characteristics of the present invention. For example, part or all of the controlling processes discussed in the above embodiment may be actualized by the hardware configuration. In the above embodiment, a roll of machine glazed paper is set via an appropriate fixture to the printer that mainly uses standard-sized sheets of cut paper. The principle of the present invention is also applicable to the printer that mainly uses a roll of machine glazed paper. The printing medium is not restricted to the roll of machine glazed paper, but may be any medium on which a large-sized image can be printed.

The scope and spirit of the present invention are limited only by the terms of the appended claims.

What is claimed is:

1. A print controller that generates print data to be supplied to a printer, said printer comprising a print head, which has a plurality of dot-forming elements arranged at a preset interval in a sub-scanning direction, and carrying out main scan and sub-scan repeatedly, so as to print an image corresponding to the supplied print data on a printing medium, the image regarding a plurality of pages arranged in series in the sub-scanning direction, said print controller comprising:

an input unit that inputs image data corresponding to the image, page division data that specifies division of each page, and an end-of data code representing an end of the image data;

an instruction input unit that inputs an instruction of executing a printing operation in a continuous printing mode, which carries out printing without any margins set between adjoining pages; and a print data generation unit that generates the print data to be supplied to said printer, wherein said print data generation unit comprises:

a feed amount data generation unit that generates feed amount data, which causes the sub-scan to be repeated by a predetermined periodic variation of feeding amount, whether or not an image is completed in each page, when the continuous printing mode is specified; and a raster data generation unit that generates raster data, which specifies a state of dot creation by said print head on each pass of the main scan, based on the image data.

2. A print controller in accordance with claim 1, wherein said raster data generation unit, in the case of an input of the page division data, waits for an input of image data with regard to a next page following the page division data and then generates the raster data, and said raster data generation unit, in the case of an input of the end-of-data code, generates the raster data without waiting for further input of image data.

3. A print controller in accordance with claim 1, wherein said print data generation unit sets a sufficiently large value, which is greater than the plurality of pages, to a size of the printing medium and subsequently generates the print data, when the continuous printing mode is specified.

4. A print controller in accordance with claim 1, wherein said instruction input unit selectively inputs the instruction of executing the printing operation in the continuous printing mode and an instruction of executing a printing operation in a standard printing mode, which carries out printing with a margin set between adjoining pages, said feed amount data generation unit generates the feed amount data that represents a specific feeding amount of the sub-scan set in advance to enable the main scan to be performed without causing any dropout of a raster line in each page, in response to the instruction of executing the printing operation in the standard printing mode, and said raster data generation unit generates the raster data with regard to each page, based on the image data input before the page division data.

5. A print controller in accordance with claim 1, wherein said feed amount data generation unit generates the feed amount data that represents a specific feeding amount of the sub-scan, which is adopted prior to the predetermined periodic variation of feeding amount in a first page among the plurality of pages, so as to enable the main scan without causing any dropout of a raster line in a certain area that is out of a main area, in which the predetermined periodic variation of feeding amount is adopted, the specific feeding amount being smaller than a mean feeding amount, which is calculated from the predetermined periodic variation of feeding amount.

6. A printing apparatus that prints an image corresponding to input print data with regard to a plurality of pages arranged in series in a sub-scanning direction, said printing apparatus comprising:

a printer that comprises a print head having a plurality of dot-forming elements arranged at a preset interval in the sub-scanning direction, and carries out main scan and sub-scan repeatedly, so as to print the image corresponding to the input print data on a printing medium; and a print controller, which comprising:
an input unit that inputs image data corresponding to the image, page division data that specifies division of each page, and an end-of data code representing an end of the image data;
an instruction input unit that inputs an instruction of executing a printing operation in a continuous printing mode, which carries out printing without any margins set between adjoining pages; and
a print data generation unit that generates the print data to be supplied to said printer,
wherein said print data generation unit comprises:
a feed amount data generation unit that generates feed amount data, which causes the sub-scan to be repeated by a predetermined periodic variation of feeding amount, whether or not an image is completed in each page, when the continuous printing mode is specified; and
a raster data generation unit that generates raster data, which specifies a state of dot creation by said print head on each pass of the main scan, based on the image data.

7. A printing apparatus in accordance with claim 6, wherein said raster data generation unit, in the case of an input of the page division data, waits for an input of image data with regard to a next page following the page division data and then generates the raster data, and
said raster data generation unit, in the case of an input of the end-of-data code, generates the raster data without waiting for further input of image data.

8. A printing apparatus in accordance with claim 6, wherein said print data generation unit sets a sufficiently large value, which is greater than the plurality of pages, to a size of the printing medium and subsequently generates the print data, when the continuous printing mode is specified.

9. A printing apparatus in accordance with claim 6, wherein said instruction input unit selectively inputs the instruction of executing the printing operation in the continuous printing mode and an instruction of executing a printing operation in a standard printing mode, which carries out printing with a margin set between adjoining pages,
said feed amount data generation unit generates the feed amount data that represents a specific feeding amount of the sub-scan set in advance to enable the main scan to be performed without causing any dropout of a raster line in each page, in response to the instruction of executing the printing operation in the standard printing mode, and
said raster data generation unit generates the raster data with regard to each page, based on the image data input before the page division data.

10. A printing apparatus in accordance with claim 6, wherein said feed amount data generation unit generates the feed amount data that represents a specific feeding amount of the sub-scan, which is adopted prior to the predetermined periodic variation of feeding amount in a first page among the plurality of pages, so as to enable the main scan without causing any dropout of a raster line in a certain area that is out of a main area, in which the predetermined periodic variation of feeding amount is adopted, the specific feeding amount being smaller than a mean feeding amount, which is calculated from the predetermined periodic variation of feeding amount.

11. A printing apparatus in accordance with claim 6, said printing apparatus further comprising:
a reverse feeding unit that feeds back the printing medium, which has been fed excessively by a printing operation in a last page among the plurality of pages, in reverse of a printing direction to a certain position suitable for starting a next cycle of the printing operation.

12. A method of controlling a printing operation by generating print data and supplying the print data to a printer, said printer comprising a print head, which has a plurality of dot-forming elements arranged at a preset interval in a sub-scanning direction, and carrying out main scan and sub-scan repeatedly, so as to print an image corresponding to the supplied print data on a printing medium, the image regarding a plurality of pages arranged in series in the sub-scanning direction, said method comprising the steps of:
(a) inputting image data corresponding to the image, page division data that specifies division of each page, and an end-of data code representing an end of the image data;
(b) inputting an instruction of executing a printing operation in a continuous printing mode, which carries out printing without any margins set between adjoining pages; and
(c) generating the print data to be supplied to said printer, wherein said step (c) comprises the steps of:
(c1) generating feed amount data, which causes the sub-scan to be repeated by a predetermined periodic variation of feeding amount, whether or not an image is completed in each page, when the continuous printing mode is specified; and
(c2) generating raster data, which specifies a state of dot creation by said print head on each pass of the main scan, based on the image data.

13. A method of printing an image with a printer, the image corresponding to input print data with regard to a plurality of pages arranged in series in a sub-scanning direction, said printer comprising a print head, which has a plurality of dot-forming elements arranged at a preset interval in the sub-scanning direction, and carrying out main scan and sub-scan repeatedly, so as to print the image on a printing medium, said method comprising the steps of:
(a) inputting image data corresponding to the image, page division data that specifies division of each page, and an end-of data code representing an end of the image data;
(b) inputting an instruction of executing a printing operation in a continuous printing mode, which carries out printing without any margins set between adjoining pages;
(c) generating the print data to be supplied to said printer; and
(d) driving said printer to carry out a printing operation, based on the input print data,
wherein said step (c) comprises the steps of:
(c1) generating feed amount data, which causes the sub-scan to be repeated by a predetermined periodic variation of feeding amount, whether or not an image is completed in each page, when the continuous printing mode is specified; and (c2) generating raster data, which specifies a state of dot creation by said print head on each pass of the main scan, based on the image data.

14. A computer readable recording medium, on which a specific program for generating print data to be supplied to a printer is recorded, said printer comprising a print head, which has a plurality of dot-forming elements arranged at a preset interval in a sub-scanning direction, and carrying out main scan and sub-scan repeatedly, so as to print an image corresponding to the supplied print data on a printing medium, the image regarding a plurality of pages arranged in series in the sub-scanning direction, said specific program comprising:

a first program code that causes a computer to input image data corresponding to the image, page division data that specifies division of each page, and an end-of data code representing an end of the image data;

a second program code that causes the computer to input an instruction of executing a printing operation in a continuous printing mode, which carries out printing without any margins set between adjoining pages; and a third program code that causes the computer to generate, as the print data to be supplied to said printer, feed amount data, which causes the sub-scan to be repeated by a predetermined periodic variation of feeding amount, whether or not an image is completed in each page, when the continuous printing mode is specified, as well as raster data, which specifies a state of dot creation by said print head on each pass of the main scan, based on the image data.

* * * * *